(12) United States Patent
Etschmaier et al.

(10) Patent No.: US 11,536,640 B2
(45) Date of Patent: Dec. 27, 2022

(54) INTEGRATED PARTICULATE MATTER SENSOR SYSTEMS

(71) Applicants: ams International AG, Jona (CH); Technische Universität Graz, Graz (AT)

(72) Inventors: Harald Etschmaier, Graz (AT); Georg Roehrer, Lebring (AT); Anderson Singulani, Graz (AT); Alexander Bergmann, Graz (AT)

(73) Assignees: ams International AG, Jona (CH); Technische Universität Graz, Graz (AT)

(*) Notice: Subject to any disclaimer, the term of this patent is extended or adjusted under 35 U.S.C. 154(b) by 50 days.

(21) Appl. No.: 16/772,453

(22) PCT Filed: Dec. 13, 2018

(86) PCT No.: PCT/EP2018/084757
§ 371 (c)(1),
(2) Date: Jun. 12, 2020

(87) PCT Pub. No.: WO2019/115689
PCT Pub. Date: Jun. 20, 2019

(65) Prior Publication Data
US 2020/0393351 A1   Dec. 17, 2020

Related U.S. Application Data

(60) Provisional application No. 62/599,168, filed on Dec. 15, 2017.

(51) Int. Cl.
*G01N 15/06*   (2006.01)

(52) U.S. Cl.
CPC ..... *G01N 15/06* (2013.01); *G01N 2015/0693* (2013.01)

(58) Field of Classification Search
CPC ........................ G01N 15/06; G01N 2015/0693
See application file for complete search history.

(56) References Cited

U.S. PATENT DOCUMENTS

| 10,189,021 B2 * | 1/2019 | Kim | ................... | B81B 1/00 |
| 10,222,333 B2 * | 3/2019 | Kotsbak | ............... | G01N 21/253 |

(Continued)

FOREIGN PATENT DOCUMENTS

WO   2016006842 A1   1/2016

OTHER PUBLICATIONS

International Search Report and Written Opinion for Application No. PCT/EP2018/084757 dated Apr. 2, 2019 (3 pages).

(Continued)

*Primary Examiner* — Dominic J Bologna
*Assistant Examiner* — Jarreas C Underwood
(74) *Attorney, Agent, or Firm* — Michael Best & Friedrich LLP

(57) ABSTRACT

A particulate matter sensor system for sensing particulate matter in a fluid includes a substrate and a cover disposed on the substrate. The cover defines at least a portion of a flow path through the microfluidic system. The sensor system includes a particulate matter sensor disposed in an interior space between the cover and the substrate. The particulate matter sensor includes an integrated sensor device electrically connected to the substrate. The flow path is defined through the particulate matter sensor. The sensor system includes a fluid circulation device disposed in the interior space between the cover and the substrate and configured to cause fluid to flow along the flow path through the microfluidic system.

24 Claims, 20 Drawing Sheets

(56) References Cited

U.S. PATENT DOCUMENTS

| | | | | |
|---|---|---|---|---|
| 2004/0087033 A1* | 5/2004 | Schembri | ............ | B01L 3/5027 |
| | | | | 435/7.1 |
| 2004/0228770 A1* | 11/2004 | Gandhi | ................ | B29C 66/723 |
| | | | | 422/504 |
| 2005/0170490 A1* | 8/2005 | Chen | .................... | B29C 66/543 |
| | | | | 435/287.1 |
| 2013/0036793 A1* | 2/2013 | White | ................ | G01N 15/0255 |
| | | | | 73/24.02 |
| 2013/0115728 A1* | 5/2013 | Okawa | .................. | B81C 3/001 |
| | | | | 216/13 |
| 2013/0266929 A1* | 10/2013 | Corso | .................. | C12M 41/00 |
| | | | | 435/286.5 |
| 2016/0097410 A1* | 4/2016 | Hussein | ................ | B64C 21/10 |
| | | | | 137/803 |
| 2019/0071627 A1* | 3/2019 | Serex | .................... | C12M 47/02 |

OTHER PUBLICATIONS

International Preliminary Report on Patentability for Application No. PCT/EP2018/084757 dated Jun. 16, 2020 (10 pages).

\* cited by examiner

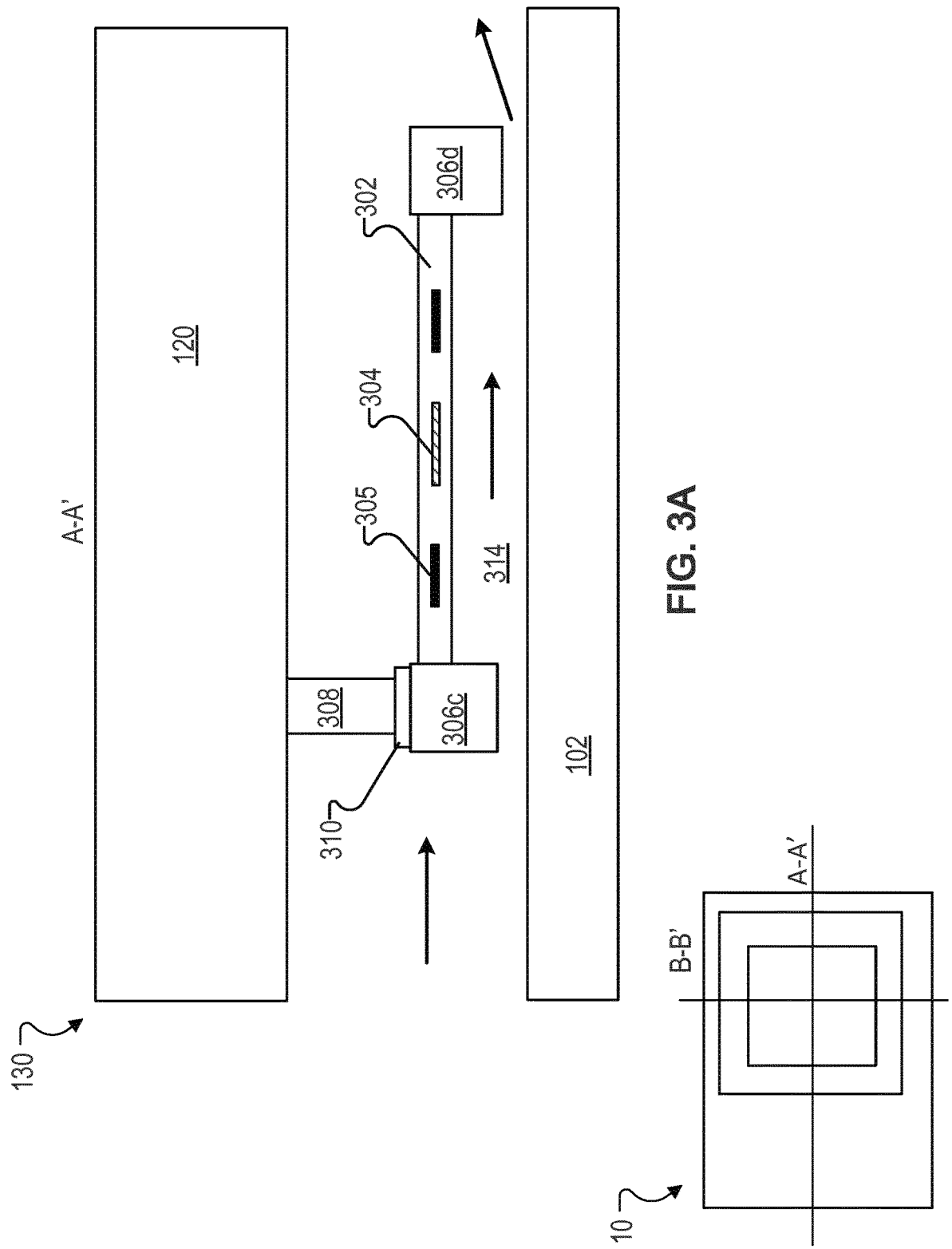

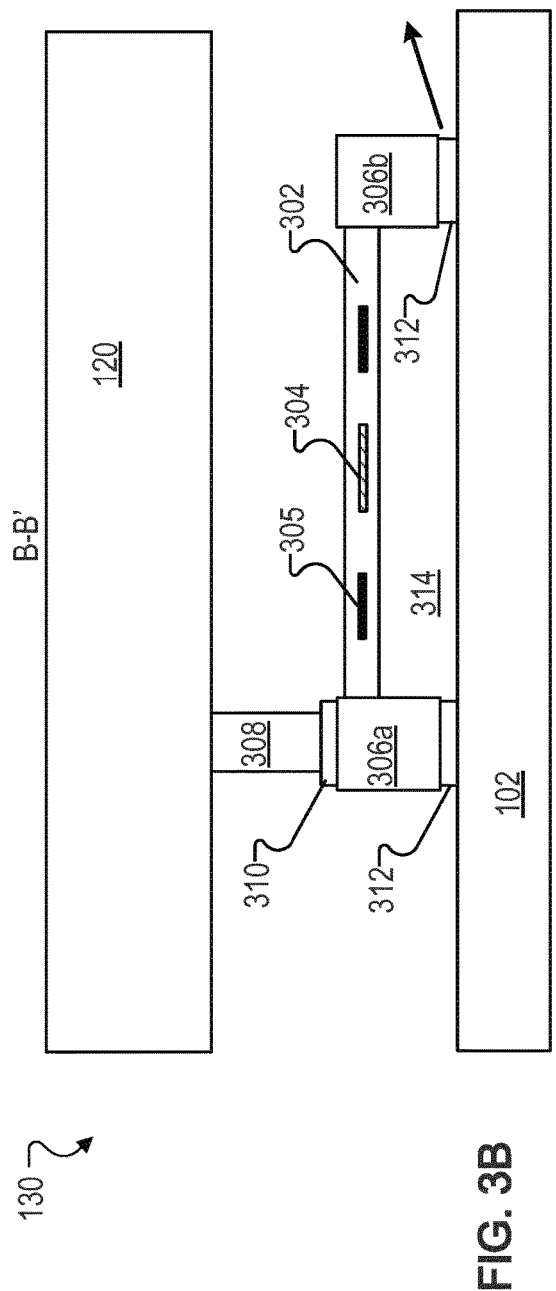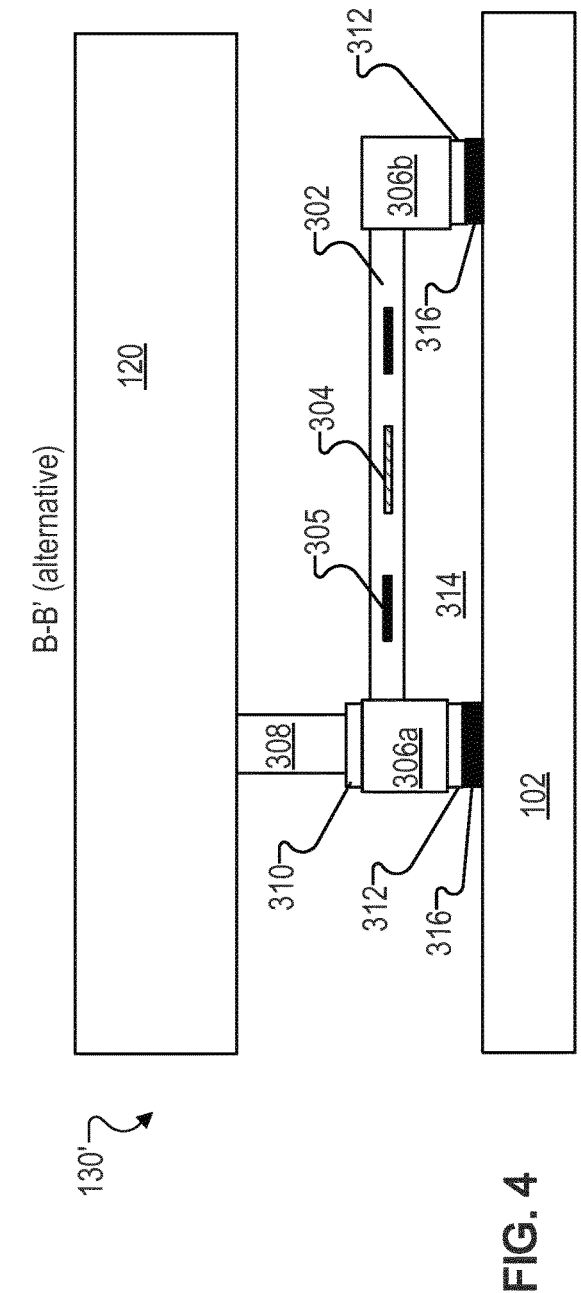

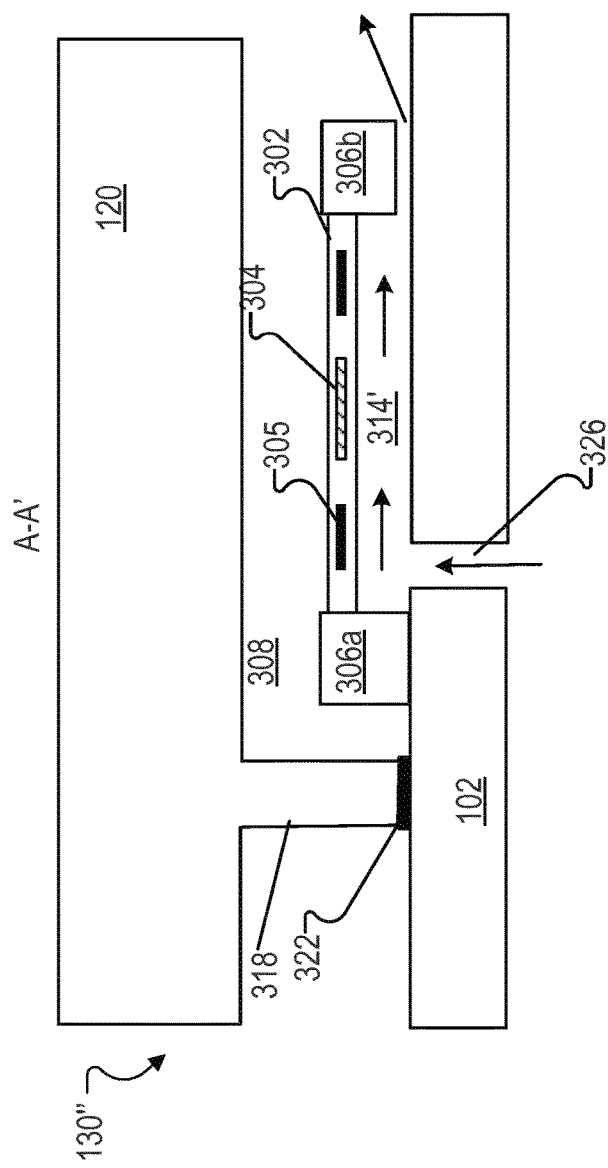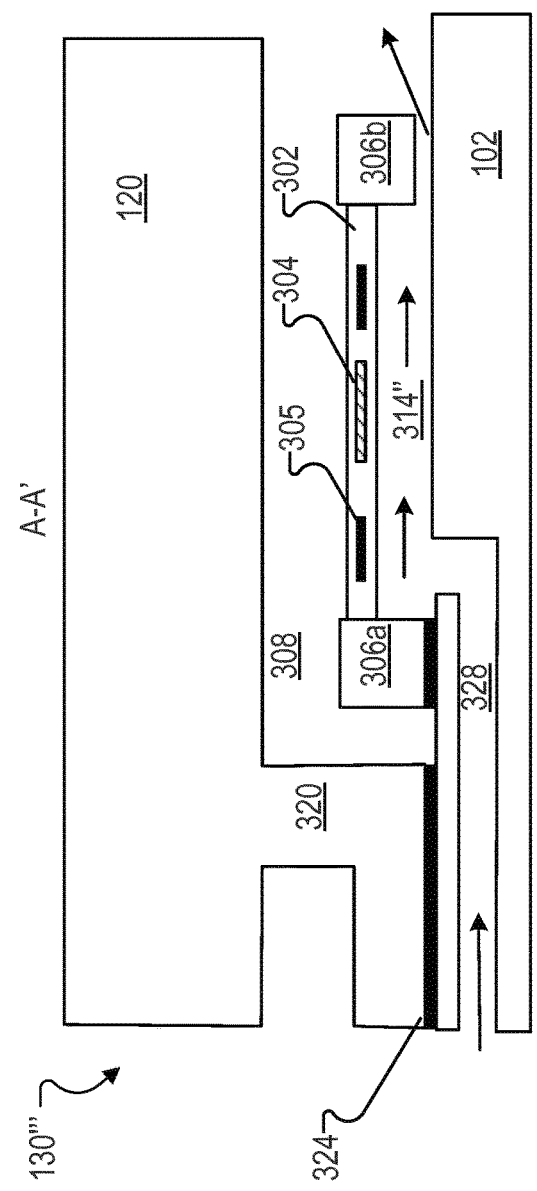

INTEGRATED PARTICULATE MATTER SENSOR SYSTEMS

CLAIM OF PRIORITY

This application is the U.S. national stage entry, under 35 U.S.C. § 371, of International Application No. PCT/EP2018/084757, filed Dec. 13, 2018, which claims priority to U.S. Provisional Patent Application No. 62/599,168, filed Dec. 15, 2017, the contents of which are hereby incorporated herein by reference in their entirety.

This application incorporates by reference the following applications: U.S. Provisional Patent Application Ser. No. 62/599,138, filed on Dec. 15, 2017; U.S. Provisional Patent Application Ser. No. 62/599,156, filed on Dec. 15, 2017; and U.S. Provisional Patent Application Ser. No. 62/720,492, filed on Aug. 21, 2018.

BACKGROUND

There are various types of particulate matter sensors, including sensors based on optical scattering, sensors based light absorption of filters, diffusion charging based sensors, sensors based on gravimetric filter analysis, beta attenuation sensors, tapered element oscillating microbalance sensors, and photoacoustic sensors.

SUMMARY

In an aspect, a particulate matter sensor system for sensing particulate matter in a fluid includes a substrate and a cover disposed on the substrate. The cover defines at least a portion of a flow path through the microfluidic system. The sensor system includes a particulate matter sensor disposed in an interior space between the cover and the substrate. The particulate matter sensor includes an integrated sensor device electrically connected to the substrate. The flow path is defined through the particulate matter sensor. The sensor system includes a fluid circulation device disposed in the interior space between the cover and the substrate and configured to cause fluid to flow along the flow path through the microfluidic system.

Embodiments can include one or more of the following features.

The substrate includes a printed circuit board.

A channel formed in the substrate defines a portion of the flow path through the microfluidic system. A channel formed in a metallization layer of the substrate defines a portion of the flow path through the microfluidic system.

The cover includes a molded cover.

The cover is glued to the substrate.

The fluid circulation device includes one or more of a pump, a fan, a heater, and an ultrasonic nozzle.

A controller for the fluid circulation device is electrically connected to the substrate.

The system includes a flow sensor electrically connected to the substrate.

The system includes a heater electrically connected to the substrate and positioned to heat fluid in a portion of the flow path.

The system includes a filter disposed at an inlet into the fluid circulation device.

One or more of a controller for the fluid circulation device, electrical components for the fluid circulation device, and a microcontroller for the particulate matter sensor are disposed in a cavity between the filter and the fluid circulation device.

The system includes a size separation feature. The size separation feature is defined by a shape of an interior of the cover.

The substrate includes a mount for the fluid circulation device, at least a portion of the flow path through the microfluidic system being defined in the mount.

The substrate includes a base part defining a first portion of the particulate matter sensor, and in which the cover defines a second portion of the particulate matter sensor. A channel formed in the base part defines a portion of the flow path through the particulate matter sensor. The base part and the cover include molded parts. The particulate matter sensor includes an optical particulate matter sensor. The base part and the cover each define at least a portion of one or more of a nozzle, an aperture, and a light trap of the optical particulate matter sensor. The particulate matter sensor includes a filter-based particulate matter sensor, and in which the base part and the cover each define at least a portion of a filter housing of the filter-based particulate matter sensor. The base part and the cover are configured to attach via a form closure.

The particulate matter sensor includes a filter-based particulate matter sensor. The integrated sensor device includes a photodetector.

The particulate matter sensor includes an optical particulate matter sensor. The integrated sensor device includes a photodetector.

The photodetector and a light source of the optical particulate matter sensor are disposed on and electrically connected to the substrate.

The optical particulate matter sensor includes a fluid flow conduit configured to induce a change in fluid pressure in the flow path through the microfluidic system.

The particulate matter sensor includes a particulate matter sensor based on thermophoretic deposition of particulate matter onto a receiving surface of the integrated sensor device.

In an aspect, a method of making a particulate matter sensor system includes disposing a particulate matter sensor on a substrate, including electrically connecting an integrated circuit device of the particulate matter sensor to the substrate. The method includes disposing a fluid circulation device on the substrate. The method includes positioning a cover on the substrate to define an interior space between the cover and the substrate. The particulate matter sensor and the fluid circulation device are contained within the interior space. The cover defines at least a portion of a flow path through the particulate matter sensor system.

Embodiments can include one or more of the following features.

The method includes forming a channel in the substrate, the channel defining a portion of the flow path through the particulate matter sensor system.

The method includes forming a channel in the cover, the channel defining a portion of the flow path through the particulate matter sensor system.

The method includes molding the cover.

Disposing a fluid circulation device on the substrate includes disposing the fluid circulation device on a mount on the substrate. The method includes forming the mount, including forming a channel in the mount, the channel defining a portion of the flow path through the particulate matter sensor system.

The method includes molding a base part to define a bottom portion of the particulate matter sensor; and disposing the base part on a PCB to form the substrate. Disposing a fluid circulation device on the substrate includes disposing the fluid circulation device on the base part. Molding a base part includes forming a channel in the base part, the channel defining a portion of the flow path through the particulate matter sensor system. The method includes attaching the cover to the base part via a form closure.

The method includes gluing the cover to the substrate.

The method includes electrically connecting a controller for the fluid circulation device to the substrate.

The method includes electrically connecting a flow sensor to the substrate.

The method includes disposing a filter at an inlet into the fluid circulation device. The method includes disposing one or more of a controller for the fluid circulation device, electrical components for the fluid circulation device, and a microcontroller for the particulate matter sensor are disposed in a cavity between the filter and the fluid circulation device. The method includes determining a size for the cavity to dampen a fluid flow fluctuation induced by the fluid circulation device.

The method includes defining a size separation feature in one or more of the cover and the substrate.

The method includes making multiple particulate matter sensor systems, including disposing multiple particulate matter sensors on the substrate, including electrically connecting an integrated circuit device of each particulate matter sensor to the substrate, disposing multiple fluid circulation devices on the substrate, and positioning the cover on the substrate to define multiple, distinct interior spaces. One particulate matter sensor and one fluid circulation device are contained within each interior space. The method includes dicing the substrate to separate the multiple particulate matter sensor systems.

In an aspect, a method of sensing particulate matter in a fluid using a particulate matter sensor system includes flowing the fluid through a flow path through the particulate matter sensor system by operating a fluid circulation device disposed on a substrate. At least a portion of the flow path is defined by a cover of the particulate matter sensor system. Flowing the fluid through the flow path includes flowing the fluid through a particulate matter sensor disposed in an interior space between the cover and the substrate. The particulate matter sensor includes an integrated sensor device electrically connected to the substrate. The method includes detecting an amount of particulate matter in the fluid by the particulate matter sensor.

Embodiments can include one or more of the following features.

Flowing the fluid through a flow path includes flowing the fluid through a channel formed in the substrate.

Flowing the fluid through a flow path includes flowing the fluid through a channel formed in the cover.

The method includes controlling operating of the fluid circulation device by a controller electrically connected to the substrate.

The method includes detecting a flow rate of the fluid by a flow sensor electrically connected to the substrate.

The method includes heating the fluid flowing through the flow path.

The method includes removing particles larger than a threshold size from the fluid by a size separation feature upstream of the particulate matter sensor.

The method includes damping a fluid flow fluctuation induced by the fluid circulation device.

The particulate matter sensors and sensor systems described here can have one or more of the following advantages. The particulate matter sensor systems can be compact and thin, e.g., because the components of the particulate matter sensor systems are disposed on a common substrate and because fluid flow channels can be formed in the substrate, the cover, or both. Fabrication of the particulate matter sensor systems can be efficient and inexpensive because the fabrication can make use of standard microelectronic packaging techniques, and because the sensor systems can be fabricated in a massively parallel approach.

BRIEF DESCRIPTION OF DRAWINGS

FIGS. 3A and 3B are diagrams of a heater and flow sensor.

FIG. 4 is a diagram of a heater and flow sensor.

FIGS. 5A and 5B are diagrams of heaters and flow sensors.

DETAILED DESCRIPTION

We describe here particulate matter sensor systems in which the components are mounted on a common substrate, such as a printed circuit board (PCB) substrate, and housed between a cover and the substrate. The sensor systems incorporate particulate matter sensors, such as optical-based sensors, filter-based sensors, contact-based sensors, or other types of sensors, that are mounted on and electrically connected to the common substrate. Fluid flow through the sensor systems is driven by fluid circulation devices, which are mounted on and electrically connected to the same substrate. Fluid flow paths through the sensor systems can be defined by channels through the substrate or through the cover, or can be defined by an interior space between the cover and the substrate.

Figure 1:
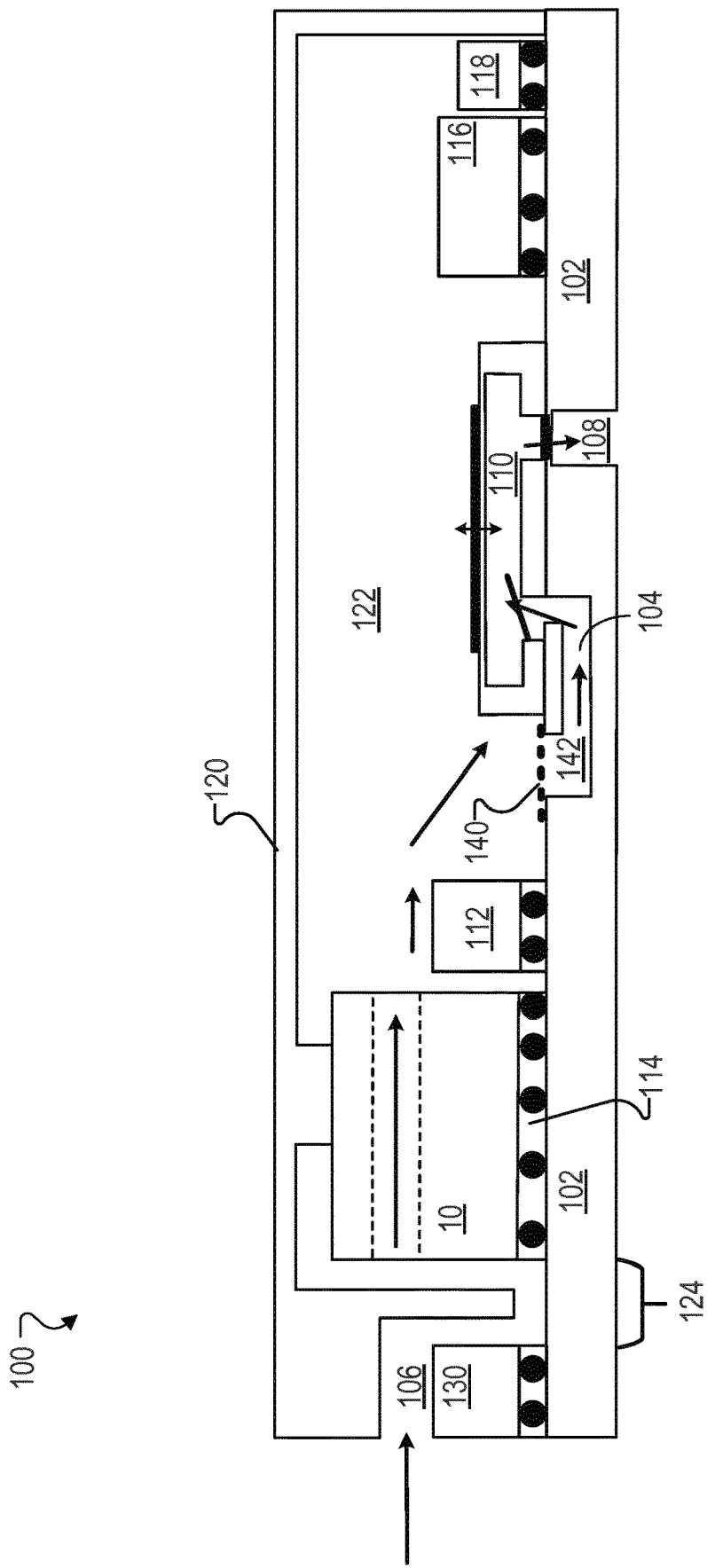
FIG. 1 is a diagram of a particulate matter sensor system.

Referring to FIG. 1, a particulate matter sensor system 100 incorporates a particulate matter sensor 10 that is configured to detect particulate matter in a fluid, such as an aerosol. A microfluidic flow path for fluid flow through the sensor system 100 is defined from an inlet 106 into the sensor system, through the particulate matter sensor 10, and out of the sensor system via an outlet 108. Fluid flow through the sensor system 100 is driven by a fluid circulation device 110, such as a pump (e.g., a piezoelectric membrane pump), a fan, a heater, an ultrasonic nozzle, or another type of fluid circulation device.

The particulate matter sensor can be an optical-based sensor that uses light scattering by particulate matter in a fluid to detect the particulate matter, as described further below and in PCT Application No. PCT/EP2018/084757, the contents of which are incorporated here by reference in their entirety. The particulate matter sensor can be a contact-based sensor that uses a thermophoretic force to drive particulate matter into contact with a receiving surface of the sensor, as described in PCT Application No. PCT/EP2018/084757, the contents of which are incorporated here by reference in their entirety. The particulate matter sensor can be a filter-based sensor that detects a change in an optical characteristic of a filter as particulate matter accumulates on the filter, as described in PCT Application No. PCT/EP2018/084757, the contents of which are incorporated here by reference in their entirety. Other types of particulate matter sensors can also be incorporated into the particulate matter sensor system 100.

The components of the particulate matter sensor system 100, including the particulate matter sensor 10 and the fluid circulation device 110, are mounted on a common substrate 102, such as a printed circuit board (PCB) substrate. The use of a common substrate to integrate the components of the sensor system makes the particulate matter sensor system 100 compact and enables efficient, inexpensive assembly. For instance, an integrated sensor system 100 in which the components are mounted on and integrated with a single PCB substrate 102 can have a height of less than about 3.5 mm, e.g., less than about 1.5 mm, e.g., between about 0.5 mm and about 2.5 mm; and a footprint of less than about 10×10 mm$^2$.

In some examples, a portion of the microfluidic path through the sensor system 100 can include microfluidic channels, such as recessed areas or holes, formed in the PCB substrate 102 or in a metallization layer (e.g., a copper layer) of the PCB substrate 102. In the example of FIG. 1, the outlet 108 from the sensor system 100 is a hole formed through the thickness of the PCB substrate 102, and an inlet 104 into the fluid circulation device 110 is a channel formed in the PCB substrate 102. The formation of microfluidic channels in the PCB substrate 102 or in a metallization layer of the PCB substrate can contribute to the compact configuration of the sensor system 100. The formation of microfluidic channels in the PCB substrate 102 or in a metallization layer can also contribute to cost efficient production of the sensor system 100, e.g., because production can be carried out by forming channels in the existing substrate.

Some types of particulate matter sensors include PCB substrates. When the particulate matter sensor 10 itself include a PCB substrate, the PCB substrate of the particulate matter sensor 10 can be the same as the PCB substrate 102 of the sensor system 100. Some types of particulate matter sensors include integrated circuit substrates, such as application-specific integrated circuits (ASICs). Such integrated circuit substrates can be mounted on and electrically connected to the PCB substrate 102 of the sensor system 100, e.g., by through-silicon vias (TSVs), backside redistribution layers, and solder balls; or by wire bonding. In some examples, an underfill material 114 can be disposed between the particulate matter sensor 10 and the PCB substrate 102, e.g., to prevent fluid from flowing between the particulate matter sensor 10 and the PCB substrate 102.

The particulate matter sensor 10 is controlled by a microcontroller 112 that is mounted on and electrically connected to the PCB substrate 102. In some examples, the microcontroller 112 can perform data processing of the data output from the particulate matter sensor 10, e.g., to determine a characterization of the fluid. In some examples, the microcontroller 112 can cause the data to be sent to an external computing device for data processing. The microcontroller 112 can also control the operation of one or more other components of the sensor system 100, including, e.g., the fluid circulation device 110, heaters, flow sensors, and other components.

A cover 120 is disposed over the PCB substrate 102 such that an interior space 122 between the cover 120 and the substrate 102 defines the microfluidic flow path for fluid flow through the sensor system 100. The components of the sensor system 100, such as the particulate matter sensor 10, the fluid circulation device 110, the microcontroller 112, heaters, flow sensors, and other components, are disposed in the interior space 122 between the cover 120 and the substrate 102. The cover 120 can be a molded piece, e.g., an injection molded piece, e.g., formed of plastic, resin, or liquid crystal polymer. The cover 120 can be glued to the PCB substrate 102 with an adhesive to such that the interior space 122 is sealed against the exterior of the sensor system 100.

In some examples, such as shown in FIG. 1, the cover 120 can be glued to the top of the particulate matter sensor 10, the sides of the particulate matter sensor 10, or both, e.g., such that the only pathway for fluid flow through the sensor system 100 is through the particulate matter sensor 10. Some types of particulate matter sensors 10 include covers, such as molded covers, and the cover of the particulate matter sensor 10 can be the same as the cover 120 of the sensor system 100.

In the example of FIG. 1, the fluid circulation device 110 is mounted on the PCB substrate 102 and in the interior space 122 between the cover 120 and the PCB substrate 102. The fluid circulation device 110 drives fluid flow through the sensor system 100. The fluid circulation device 110 can be a pump, such as a piezoelectric membrane pump (as shown in FIG. 1), a diffuser pump, or a micro jet pump; a fan; or another type of fluid circulation device. The fluid circulation device 110 can be controlled by a controller 116, which can include a charge pump or a boost converter to generate an operating voltage for the fluid circulation device. In some examples, electrical components such as capacitors and inductors 118 can be used by the controller in generating the operating voltage. For instance, the controller 116 can generate an operating voltage of, e.g., about 80 V, from a voltage supply to the system of less than about 5 V (e.g., 5.0 V, 3.3 V, 2.5 V, or 1.8 V).

The controller 116 and capacitors and inductors 118 can be mounted on and electrically connected to the PCB substrate 102. The control of the fluid circulation device 110 by a controller 116 that is mounted on the same PCB substrate 102 as the fluid circulation device 110 itself helps to ensure that high voltages (e.g., 20-300 V) used to operate the fluid circulation device 110 do not harm human operators or damage other electronics near the sensor system 100. In some examples, e.g., when the operating voltage of the fluid circulation device is relatively low, the electrical components such as capacitors and inductors 118 can be integrated into the controller 116.

In some examples, high voltage components of the sensor system 100, such as the controller 116, electrical components such as capacitors and inductors 118, or a membrane of the fluid circulation device 110, can be disposed in a chamber that is isolated from the fluid in the sensor system 100. This configuration can provide further protection to help ensure that the high voltages used to operate the fluid circulation device 110 do not cause harm or damage.

In some examples, particulate matter larger than a threshold size can be undesirable. For instance, small particulate matter, such as particulate matter having a diameter of less than about 2.5 µm, can be of particular interest in air quality measurements, while larger particulate matter can be of less concern. However, larger particulate matter can sometimes clog or otherwise impact the operation of the particulate matter sensor 10. The sensor system 100 can include a size separation feature 124, such as an impactor, a virtual impactor, a cyclone, a diffusion screen a filter, or another type of size separation feature that can prevent particulate matter larger than a threshold size from flowing into the particulate matter sensor 10. For instance, the size separation feature 124 can be configured to remove particulate matter having a diameter of greater than about 5 µm, greater than about 10 µm, or greater than about 20 µm. In some examples, such as when the particulate matter sensor 10 is not adversely affected by the presence of larger particulate matter, the size separation feature 124 can be not included in the sensor system 100.

The size separation feature 124 can be an impactor, such as a virtual impactor, that takes advantage of the inertia of the particulate matter in the fluid to remove larger particulate matter from the fluid flow path into the particulate matter sensor 10. For instance, the size separation feature 124 can be an impactor having a partitioned flow path, with one portion of the partitioned flow path having a sharp turn that leads to the particulate matter sensor 10, and the other partition being straight and bypassing the particulate matter sensor 10. Smaller particles, with less inertia, are able to change direction and follow the sharp turn of the flow path into the particulate matter sensor 10. Larger particles have more inertia and are less able to change direction; these larger particles follow the straight flow path and bypass the particulate matter sensor 10.

Figure 2A:
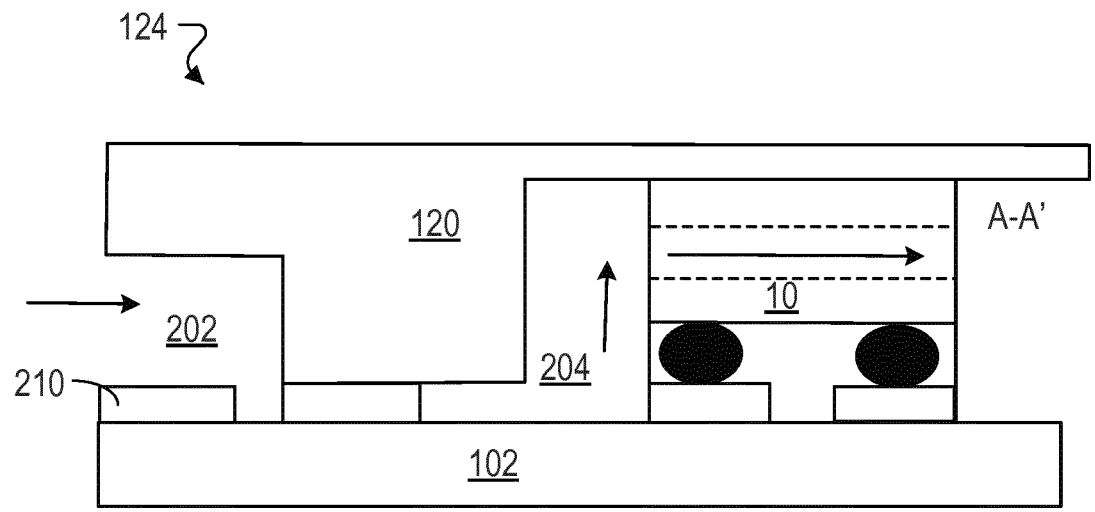
FIGS. 2A and 2B are cross-sectional and top views, respectively, of a size separation feature of a particulate matter sensor system.
Figure 2B:
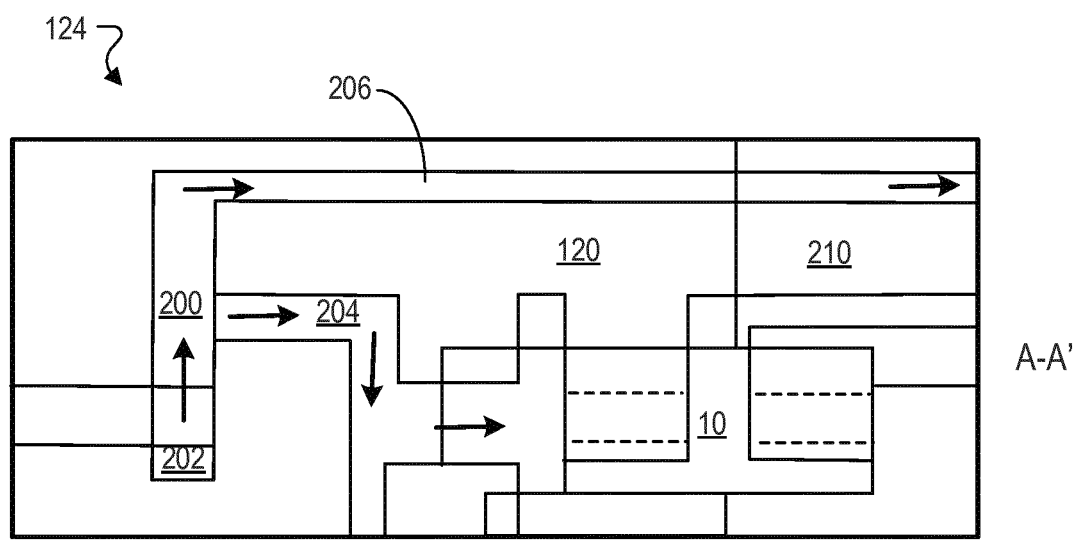

FIGS. 2A and 2B show cross-sectional and top views, respectively, of an example size separation feature 124 implemented as a virtual impactor. An input portion 202 of the flow channel is partitioned at an intersection 200 into a major flow channel 204 and a minor flow channel 206, each channel 204, 206 designed to carry a corresponding fraction of the total fluid flow from the input portion 202. For instance, the ratio of fluid flow in the major flow channel 204 to fluid flow in the minor flow channel 206 can be about 20:1, about 15:1, 10:1, about 5:1, or another amount. At the intersection 200, the major flow channel 304 turns a sharp (e.g., about 90°) corner, while the minor flow channel 206 continues straight. The major flow channel 204 leads to the particulate matter sensor 10; the minor flow channel 206 bypasses the particulate matter sensor. As fluid flows into the intersection 200, smaller particulate matter with relatively low inertia is able to turn the sharp corner of the major flow channel 204 and flows into the particulate matter sensor 10 for measurement. Larger particulate matter, with relatively higher inertia, is unable to turn the sharp corner, and flows straight into the minor flow channel 206, bypassing the particulate matter sensor 10.

Figure 8A:
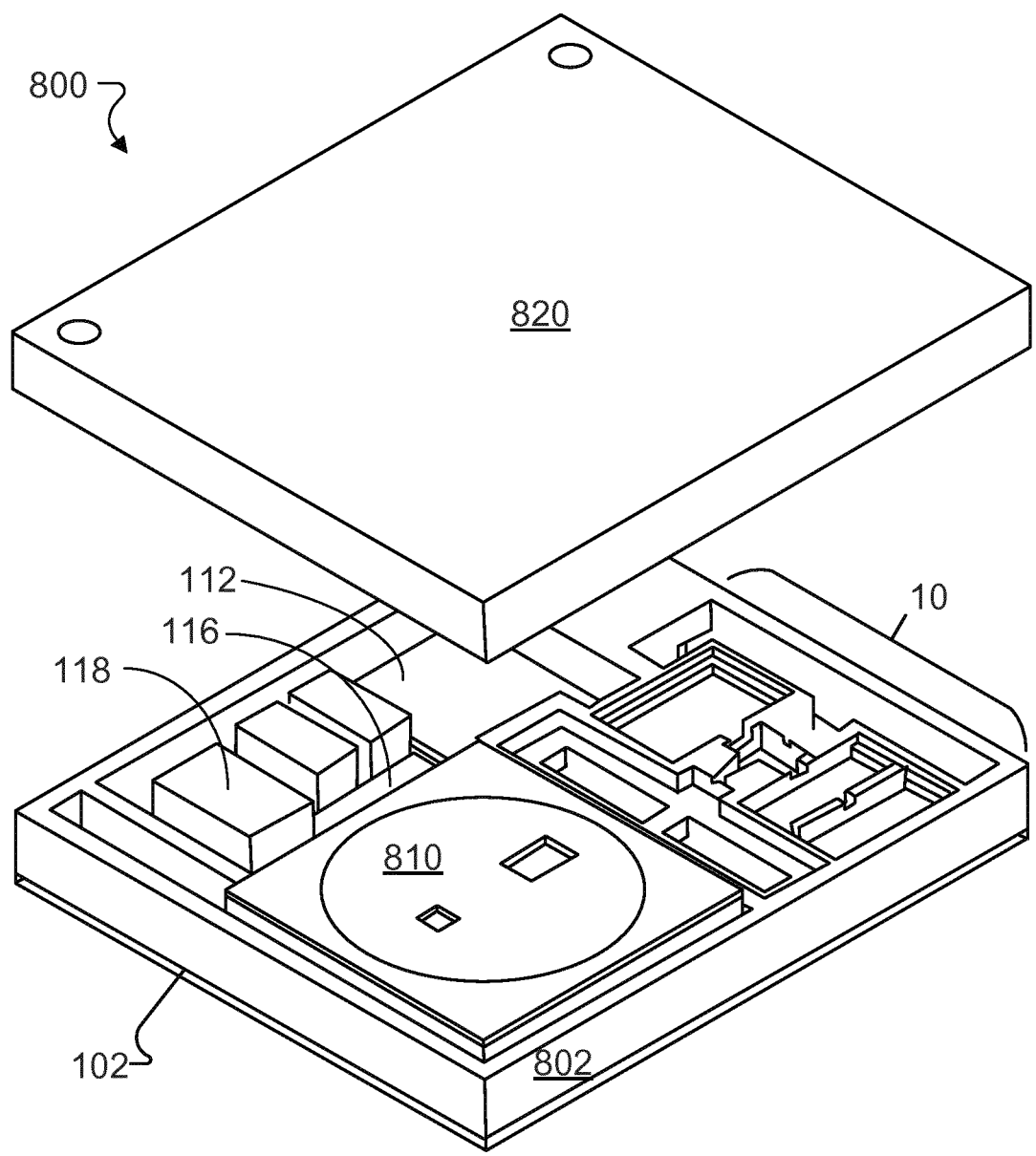
FIGS. 8A-8C are exploded views of a particulate matter sensor system.
Figure 8C:
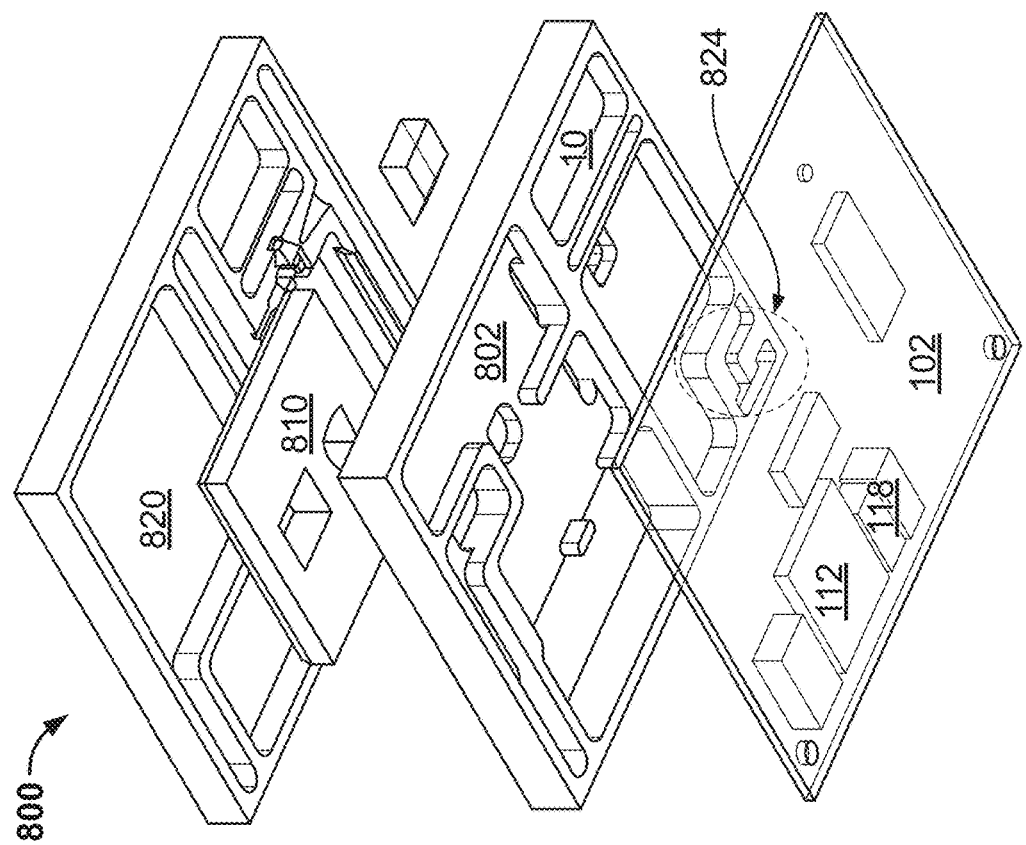
Figure 8B:
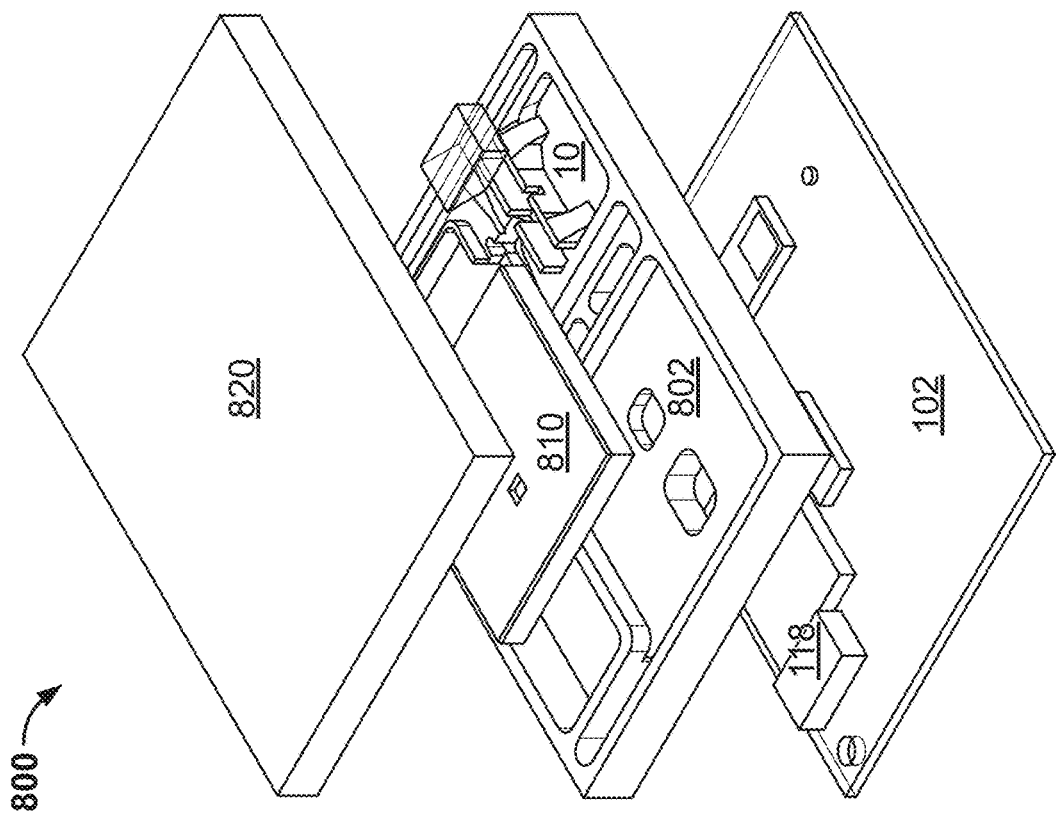

In the example of FIGS. 2A and 2B, the size separation feature 124 is formed by the shape of the interior of the cover 120 and by structure, e.g., channels, formed in a metallization layer 210 of the PCB substrate 102. In some examples, the size separation feature 124 can be formed by structure, e.g., channels, formed in the PCB substrate 102, in addition to or instead of in the metallization layer of the PCB substrate 102 or the cover 120. In some examples, the size separation feature 124 can be formed by the shape of the interior of the cover 120, e.g., without structure formed in the PCB substrate 102 or in a metallization layer of the PCB substrate. In some examples, e.g., as shown in FIGS. 8A-8C, the size separation feature 124 can be formed in a molded part of the sensor system or between two molded parts of the sensor system.

Referring again to FIG. 1, the sensor system 100 can include a heater 130 positioned at the inlet 106 of the microfluidic flow path. The heater 130, e.g., a resistive heater, can heat the fluid flowing into the sensor system 100 to reduce the humidity of the fluid flowing through the system. Reducing humidity of the fluid can prevent condensation problems in the sensor system 100, such as erroneous sensor readings or water droplets blocking fluid flow through a portion of the microfluidic channel through the sensor system. The heater 130 can also help to reduce cross sensitivity of the sensor system 100, e.g., enabling the sensor system 100 to perform reliably across a range of different environmental conditions.

The sensor system 100 can include a flow sensor for detecting a mass or volume flow rate of fluid through the sensor system 100. In some examples, the flow sensor can be a standalone device, such as a hot film anemometer. In some examples, the heater 130 can function as a flow sensor to detect a flow rate of fluid, e.g., based on a change in temperature of the air flowing through the heater 130. In some examples, such as when the flow is sufficiently accurately defined by the operating conditions (e.g., voltage or frequency) of the fluid circulation device 110, the flow sensor can be omitted.

FIGS. 3A and 3B show an example heater 130, such as a microhotplate. FIG. 3A shows a cross-sectional view of the heater 130 along line A-A', seen in a top view 10 of the sensor 100. FIG. 3B shows a cross-sectional view of the heater along line B-B'. The heater 130 includes a membrane 302, such as a dielectric membrane disposed in the interior space between the cover layer 120 and the PCB substrate 102. A heating element 304, e.g., a resistive heater, e.g., a heating coil, can be formed in the dielectric membrane. In some examples, the heater 130 can include one or more temperature sensors 305, e.g., to monitor the temperature of the fluid in the system or to provide data for temperature-based determination of flow rate. The heater 130 also includes a support structure 306 (shown as portions 306a-306d) surrounding the edges of the membrane 302, e.g., to provide structural stability for the membrane 302. For instance, the support structure 306 can be a silicon-based support structure. For instance, the heater fabricated from silicon by etching the silicon away below the membrane, e.g., as described in EP1065475, the contents of which are incorporated here by reference in their entirety.

The membrane 302 is connected to the cover 120 such that both surfaces of the membrane 302 are exposed to interior space between the PCB substrate 102 and the cover 120. For instance, the membrane 302 can be connected to the cover 120 by a barrier post 308 that is connected to the support structure 306. The barrier post 308 can be oriented substantially orthogonal to the surface of the heating element 304. In some examples, the barrier post 308 can be integral with the cover 120, e.g., formed in the same molding process. The barrier post 308 can be affixed to the support structure 306 by an adhesive, e.g., a glue. In some examples, the barrier post can be integral with the support structure 306 and affixed to the cover 120 by an adhesive, e.g., a glue.

Two, opposite sides 306a, 306b of the support structure 306 are affixed to the PCB substrate 102 by an adhesive 312, e.g., a glue. In some examples, the adhesive can be a conductive adhesive and a conductive pathway can exist through one or more of the sides 306a, 306b, e.g., such that the heater 120 can be controlled by a signal from the PCB substrate 102. The other two sides 306c, 306d of the support structure 306 are not affixed or otherwise connected to the PCB substrate 102; rather, a gap is present between the sides 306c, 306d of the support structure 306 and the PCB substrate 102. So, the height of the glue determines the height of the gap.

The barrier post 308 and the support structure 306 together help to define a portion 314 of the microfluidic channel through the sensor system. The barrier post 308 prevents fluid from flowing between the membrane 302 and the cover 120, instead guiding the fluid to flow through the portion 314 of the microfluidic channel between the membrane 302 and the PCB substrate 102. The sides 306a, 306b of the support structure form side walls of the portion 314 of the microfluidic channel, guiding the fluid to stay between the membrane 302 and the PCB substrate 102. The barrier post forces the fluid flow to pass between the membrane 302 and the PCB substrate 102 such that all fluid in the system is heated by the heater 130.

FIG. 4 shows an example heater 130' in which the sides 306a, 306b of the support structure 306 are attached to a metallization layer 316, e.g., a copper layer, of the PCB substrate 102. For instance, the adhesive 312 connecting the sides 306a, 306b of the support structure to the metallization layer 316 can be a conductive adhesive such that the heater 120' can be controlled by a signal from the PCB substrate 102. Here, the height of the glue plus the height of the metallization layer determines the size of the gap. In the configuration of FIG. 4, through silicon vias can be formed through the heater 130' to connect the top side of the heater 130' with the back side of the heater 130'.

FIGS. 5A and 5B show example heaters 130'', 130''', respectively, in which the support structure 306 is not attached to the cover 120. The cover 120 is directly attached to the PCB substrate 102 by a barrier post 318, 320, respectively, e.g., with an adhesive 322, 324. Fluid enters into a portion 314', 314'' of the microfluidic channel through a fluid channel 326, 328, respectively, formed in the PCB substrate 102.

Other configurations for fluid flow through the heater can also be used. In the examples of FIGS. 5A and 5B, the fluid channels are formed in the PCB substrate. In some examples, fluid channels can be formed in a metallization layer of the PCB substrate. In some examples, fluid channels formed in the PCB substrate and/or in a metallization layer of the PCB substrate can be used as outlet channels for fluid exiting the heater.

In some examples, the controller 116 of the fluid circulation device 112 can be used in place of the heater 130, e.g., such that waste heat from a pump driver chip or other type of controller 116 heats the fluid in the sensor system 100. In some examples, waste heat from the microcontroller 112 can be used in place of the heater 130 to heat the fluid in the sensor system 100.

Referring again to FIG. 1, the microcontroller 112, which is mounted on and electrically connected to the PCB substrate 102, controls the operation of the particulate matter sensor 10. The microcontroller 112 can also be operable to process raw data from the particulate matter sensor 10, e.g., for calculation of sensor readings. For instance, for an optical sensor, the microcontroller 112 can use the number of detected pulses and the pulse-height of each pulse to calculate an estimated mass (e.g., in μg) of particulate matter in the fluid flowing through the sensor system 100.

In some examples, the microcontroller 112 can use raw data from a flow sensor (e.g., the flow sensor in the heater 130) in conjunction with the raw data from the particulate matter sensor 10 to calculate an estimated mass per volume (e.g., in $\mu g/m^3$) of particulate matter in the fluid. In some examples, the microcontroller can obtain the driving frequency of the fluid circulation device 110 and can use that information in conjunction with the raw data from the particulate matter sensor 10 to calculate the estimated mass per volume of particulate matter in the fluid. In some examples, the microcontroller can use the temperature measured by the temperature sensor 305 in the heater 130, the driving frequency of the fluid circulation device 110 to estimate the flow rate, and can use the flow rate in conjunction with the raw data from the particulate matter sensor 10 to calculate an estimated mass per volume of particulate matter in the fluid. In some examples, a user of the sensor system can process the raw data, e.g., by programming the microcontroller 112 or by using the microcontroller 112 as a data transfer device to transfer data to an external computing device.

In the examples shown here, the temperature sensors 305 are integrated with the heater 130. In some examples, the sensor system can include a separate chip including a temperature sensor. In some examples, a temperature sensor can be integrated with the microcontroller 112.

In some examples, such as for optical particulate matter sensors 10, the optical scattering sensor can provide pulse-length data, which are proportional to the speed of the fluid inside the sensor 10 and to the flow rate of the fluid in the sensor system 100. The microcontroller 112 can use the pulse-length data in conjunction with raw data from the optical particulate matter sensor 10 to calculate the estimated mass per volume of particulate matter in the fluid.

In some examples, the microcontroller 112 can control the frequency or drive voltage of the fluid circulation device 110 to obtain a target flow rate. In this approach, the size characteristic of the size separation feature 124, which depends on the flow rate, can be held constant.

In some examples, a filter 140 is positioned upstream from the inlet 104 to the fluid circulation device 110, e.g., to prevent particulate matter from blocking the inlet 104 or mechanisms of the fluid circulation device (e.g., valves; a membrane 143, for a membrane pump; a diffuser or nozzle for a diffuser pump; or a nozzle for a micro jet pump). The filter 140 can be, e.g., a membrane filter or a fiber filter. Preventing particulate matter from reaching the fluid circulation device 110 can help to prevent performance degradation and can prolong the lifetime of the fluid circulation device 110.

In some examples, such as when the fluid circulation device 110 is a pump, e.g., a membrane pump, fluid flow through the pump is discontinuous. During the first half of a pump cycle, fluid is pulled into the pump; during the second half of the cycle, fluid is expelled from the pump. This discontinuity in fluid flow through the pump can propagate to cause fluctuations in fluid flow rate along the flow path through the sensor system 100. For some types of particulate matter sensors 10, such as optical-based sensors (described below), such fluctuations in fluid flow rate can adversely affect the sensor measurements, making the sensor system 100 less able to generate accurate data. Fluctuations in fluid flow rate can also adversely affect the operation of other components of the sensor system 100. For instance, the function of the size separation feature 124 can depend on fluid flow rate; fluctuations in the flow rate can affect the size of the particulate matter that arrives at the particulate matter sensor 10.

Figure 6:
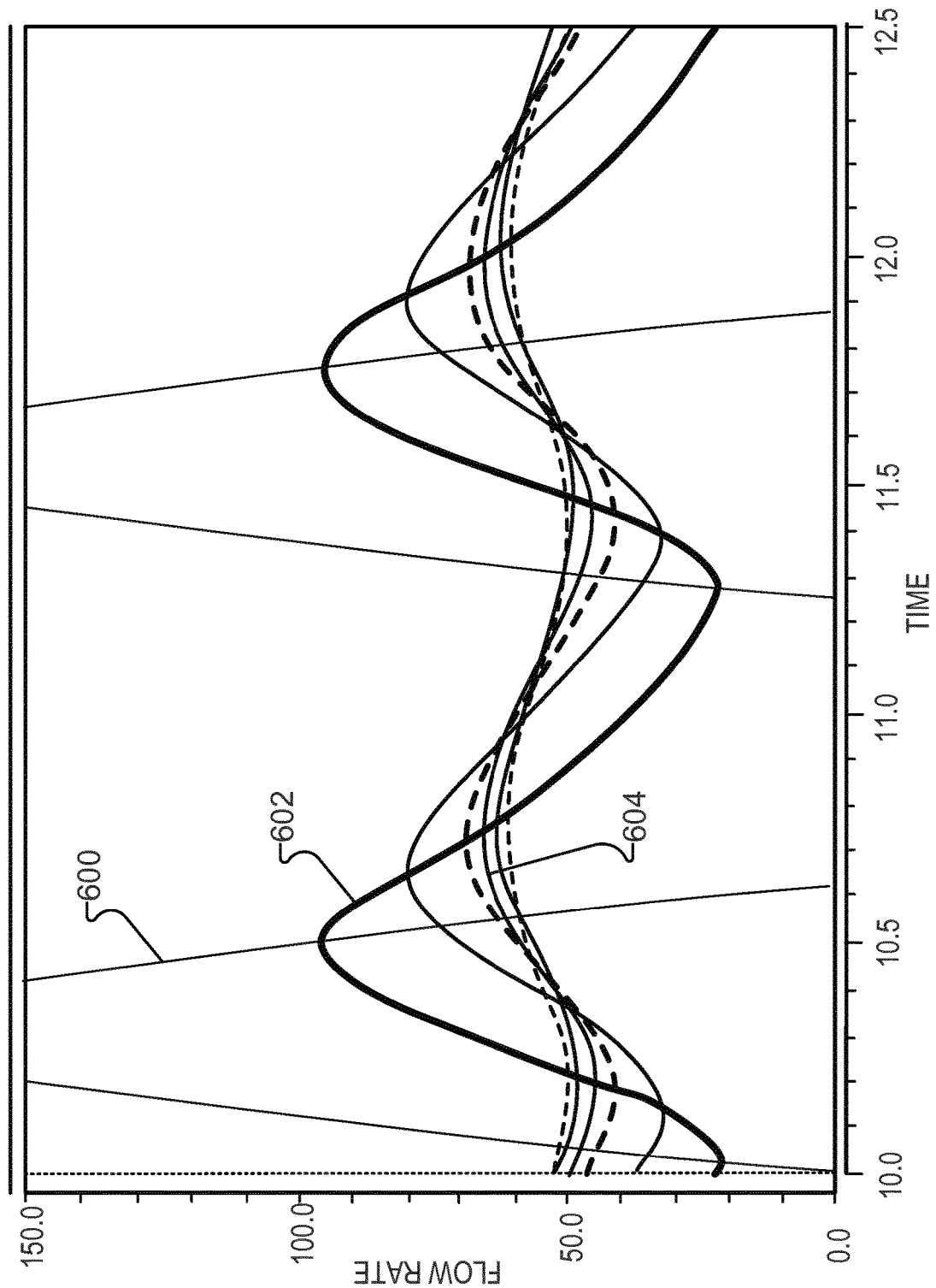
FIG. 6 is a plot of flow rate versus time.

FIG. 6 is a plot of fluid flow rate over time. A curve 600 showing the flow rate of fluid in the pump indicates significant fluctuations in flow rate as the pump carries out its pumping cycle. A curve 602 shows the flow rate of fluid at the particulate matter sensor 10. As can be seen from the curve 602, the system affects some damping of the fluctuations. Without being bound by theory, it is believed that this damping may be due to the presence of fluid in the channel between the particulate matter sensor 10 and the pump 110. However, for some particulate matter sensors 10, even the fluctuations shown in the curve 602 can present adverse effects on sensor performance.

The sensor system 100 can be configured to further mitigate these fluctuations, resulting in a more constant fluid flow rate through the particulate matter sensor. For instance, as discussed further below, one or more of the filter 140 upstream of the pump 110 and a volume of the interior space 122 between the pump 110 and filter 140 can be designed to achieve damping of the fluid flow fluctuations.

Referring again to FIG. 1, in some examples, the filter 140 can have a damping effect on the fluctuations in fluid flow rate. For instance, features of the filter 140, such as the fluid resistance of the filter (e.g., the size or volume fraction of holes in the filter), can be selected to achieve a fluid resistance that dampens the fluctuations. In some examples, the fluid resistance of the filter 140 can be balanced against a pressure drop across the filter 140 that enables the pump 110 to pump a target fluid volume per cycle.

In some examples, a volume of a cavity 142 between the pump 110 and the filter 10 can be tuned to achieve a desired amount of damping. For instance, the volume of the cavity can be made larger, e.g., maximized, subject to size constraints for the sensor system 100. In some examples, components of the sensor system 100, such as the microcontroller 112, the controller 116 of the fluid circulation device 110, the high voltage supply 118, or other components, can be disposed in the cavity 142 to enable the cavity 142 to be made large while complying with size constraints for the sensor system 100.

Referring again to FIG. 6, a curve 604 shows the flow rate of fluid at the particulate matter sensor 10 for a system having a filter 140 designed to achieve a fluid resistance that dampens the fluctuations, and having a large cavity 142. As can be seen from the curve 604, the fluctuations are significantly dampened as compared to the curve 602. With the significant dampening of the fluctuations in this configuration, the flow rate at the particulate matter sensor 10 is substantially independent of the pumping cycle, which can contribute to better sensor performance. Other curves in FIG. 6 show the effect of varying the volume V1 of the cavity 142 between the pump 110 and the filter 10, and the volume V2 of the interior space 122 between the filter and the outlet of the particulate matter sensor 10. As can be seen from FIG. 6, these volumes generally have an effect on the degree to which the fluctuations are dampened.

In some examples, to mitigate fluctuations, a wall is formed, e.g., by the configuration of the cover 120, to separate the volume of fluid around the pump 110 from the volume of fluid in the particulate matter sensor 10. The presence of a wall can contribute to further damping of the fluctuations, e.g., in that the pump membrane directly affects only the fluid on the pump side of the wall.

In some examples, other components of the sensor system 100 can contribute to enhanced damping of the fluctuations. For instance, when the particulate matter sensor 10 is an optical based sensor having a fluid flow conduit, such as a nozzle-shaped fluid flow conduit (as described below), a drop in fluid pressure across the fluid flow conduit can help to smooth the fluid flow rate.

Figure 7:
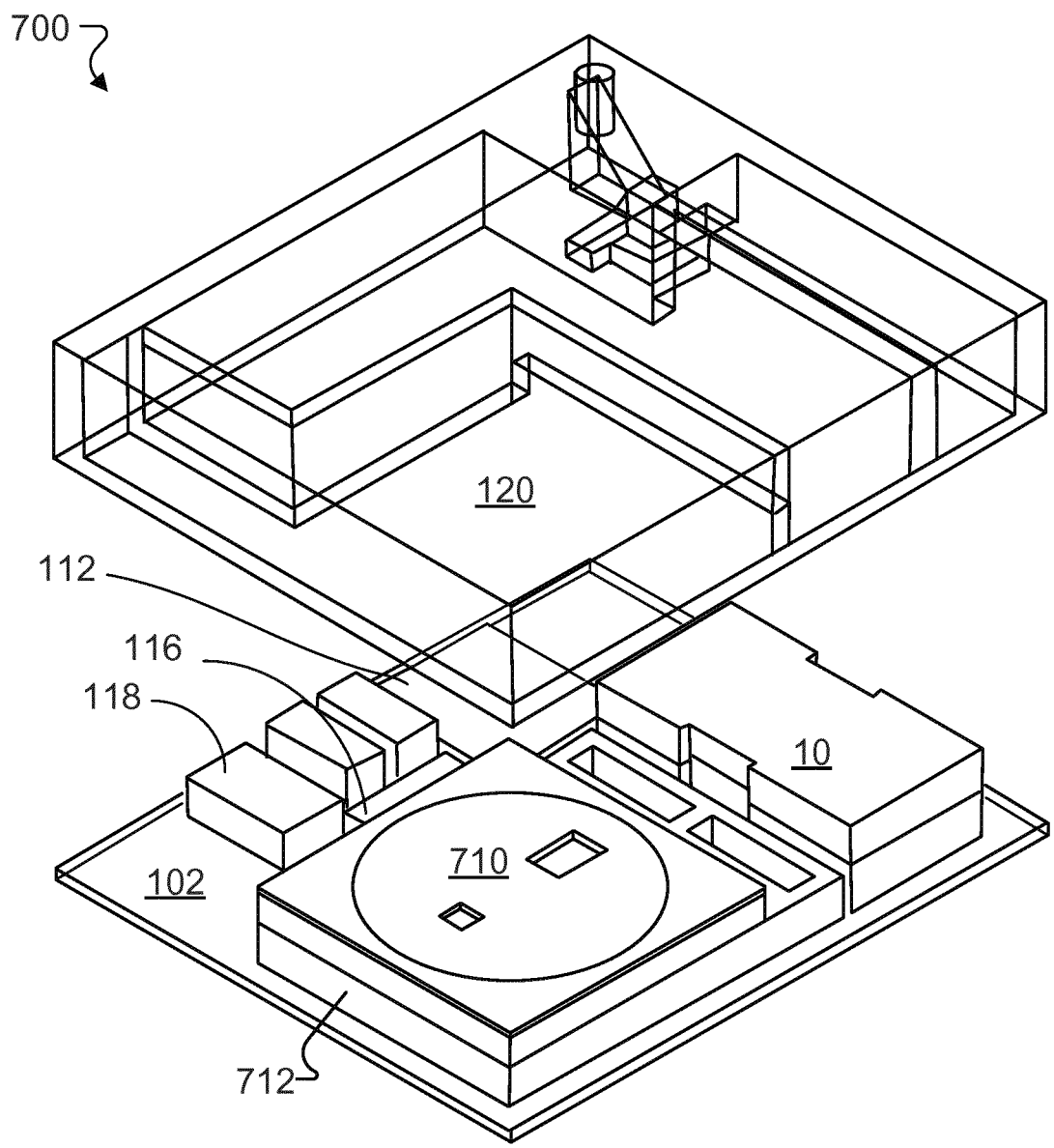
FIG. 7 is an exploded view of a particulate matter sensor system.

FIG. 7 shows an exploded view, of an example particulate matter sensor system 700. The particulate matter sensor system 700 shares many components with the sensor system 100 discussed above. In the sensor system 700, a fluid circulation device 710 is disposed on a mount 712, such as a molded plastic die, which is disposed on the PCB substrate 102. The fluid circulation device 710 is electrically connected to the PCB substrate 102, e.g., by wire bonding. A fluid flow inlet into the fluid circulation device 710 is defined in the mount 712, e.g., rather than in the PCB substrate 102 (as in FIG. 1). The cover 120 is disposed onto the PCB substrate 102 such that the fluid circulation device 710, mount 712, and other components of the sensor system 700 are disposed within an interior space between a cover 720 and the substrate 102. For instance, the cover 720 is glued to the PCB substrate 102 to form a fluid-tight interior of the sensor system.

FIGS. 8A-8C show exploded views of an example particulate matter sensor system 800. The particulate matter sensor system 800 shares many components with the sensor system 100 discussed above. In the sensor system 800, a base part 802, e.g., a molded component, is formed to define bottom portions of various components of the sensor system 800. For instance, the base part 802 can define a mount for a fluid circulation device 810, including an inlet 806 into the fluid circulation device 810. The base part 802 can define bottom portions 804 of the particulate matter sensor 10 (e.g., bottom portions 804 of nozzles, apertures, and light traps, for an optical based sensor, described below; a filter housing, for a filter-based sensor, or other portions of the particulate matter sensor 10). The base part 802 can define a region 808 in which components such as the microcontroller 112, the fluid circulation device controller 116, and the electrical components, such as capacitors and inductors 118, can be positioned. An impactor 824 is defined in the base part 802. A cover 820 is formed, e.g., by molding, to define top portions of various components of the sensor system 100, and is positioned over the base part 802 to form the complete sensor system 800. For instance, the cover 820 and the base part 802 can be configured to be attached via a form closure.

Figure 9:
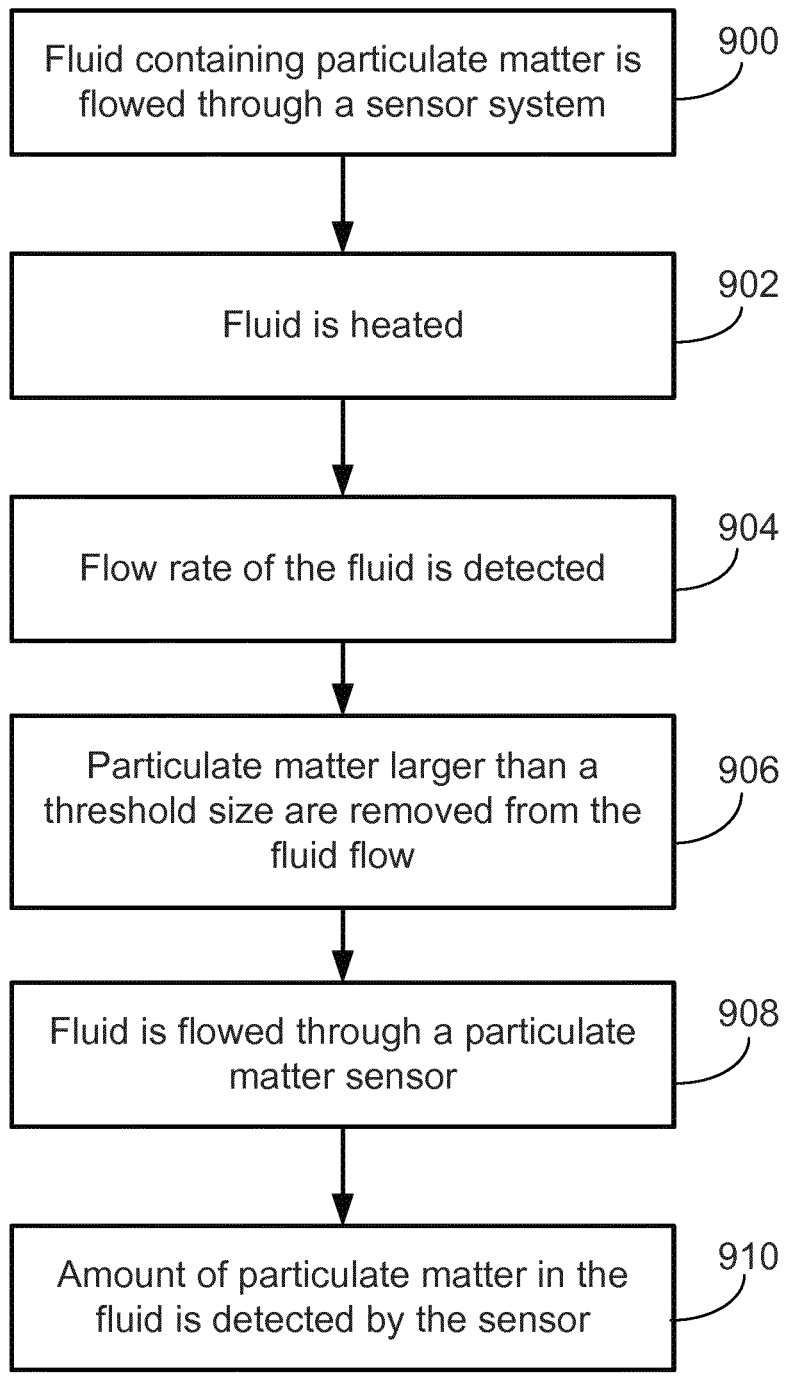
FIGS. 9-11 are flow charts.

Referring to FIG. 9, in an example process for using the sensor system to detect particulate matter in a fluid, a fluid containing particulate matter is flowed through a particulate matter sensor system (900), e.g., by operation of a fluid circulation device, such as a pump or a fan, controlled by a controller electrically connected to a PCB substrate of the sensor system. In some examples, at least some of the flow path through the particulate matter sensor system is formed in the PCB substrate, or in a metallization layer of the PCB substrate. In some examples, at least some of the flow path is formed by the shape of a cover of the sensor system. In some examples, the substrate of the sensor system can include a molded base part disposed on the PCB substrate, and at least some of the flow path can be formed by the shape of the molded base part.

The fluid is heated (902), e.g., to reduce humidity and prevent condensation problems in the sensor system. The flow rate of the fluid is detected (904), e.g., using a flow sensor such as a hot film anemometer or a thermal-based flow rate sensor. Particles larger than a threshold size are removed from the fluid (906) by a size separation device, such as a virtual impactor.

The fluid is flowed through a particulate matter sensor that is electrically connected to the PCB substrate (908). An amount of particulate matter in the fluid is detected by the particulate matter sensor (910). For instance, the particulate matter sensor can be an optical-based sensor, a mass sensitive sensor, a capacitive sensor, a sensor comprising a waveguide, a filter-based sensor, or another type of sensor.

The particulate matter sensor systems described here can be fabricated in parallel, e.g., for efficient and low-cost manufacturing. For instance, multiple particulate matter sensor systems, e.g., hundreds of sensors, can be fabricated in parallel on a single PCB substrate, and the PCB substrate can be singulated into individual sensor systems.

Figure 10:
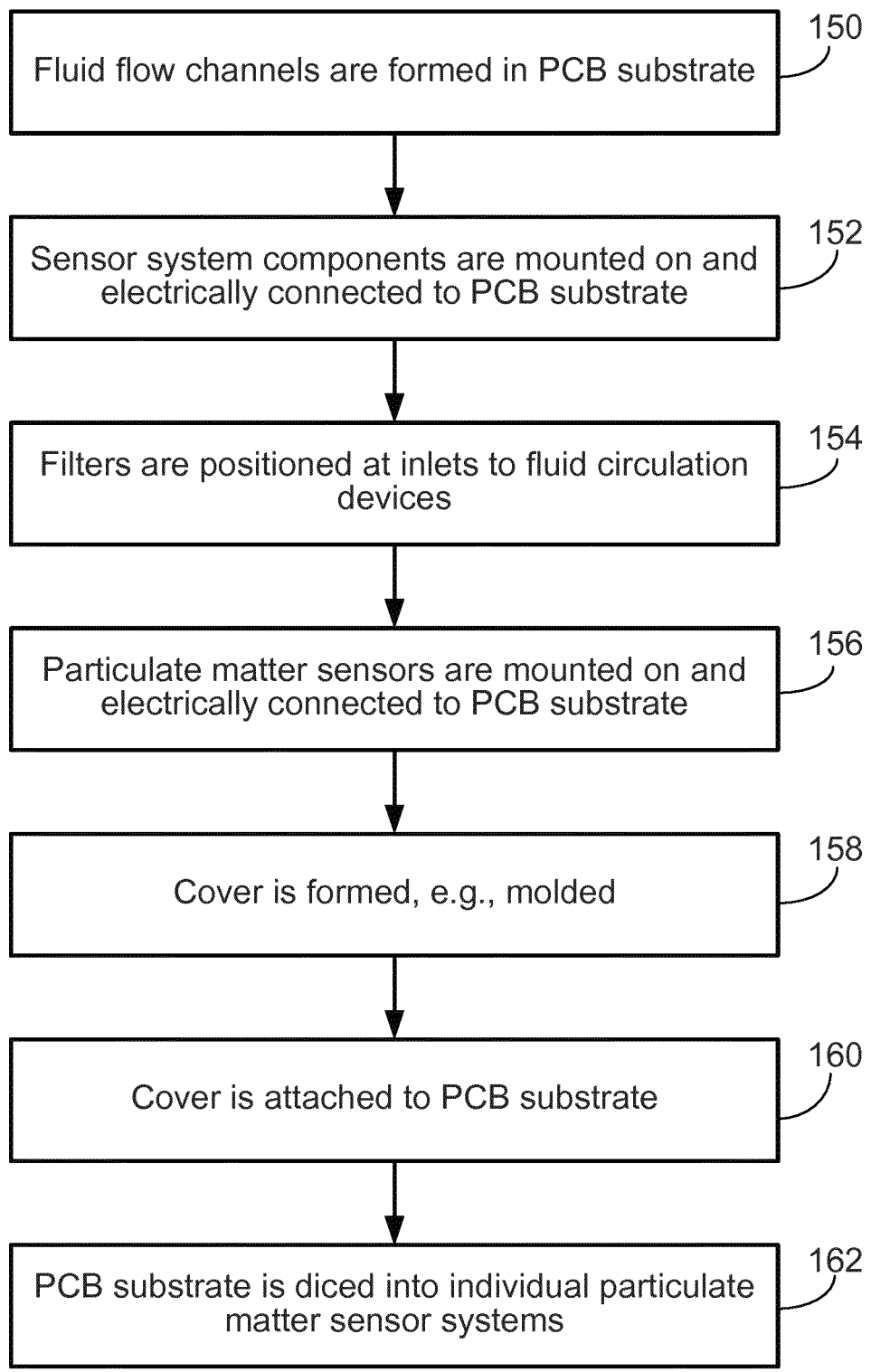

Referring to FIG. 10, in an example process for parallel manufacture of multiple particulate matter sensor systems, standard microelectronics packaging techniques can be employed for efficient, low-cost fabrication. In some examples, fluid flow channels are formed in a PCB substrate (150) to define a portion of a fluid flow path through each of the multiple sensor systems. For instance, the fluid flow channels can be formed to define an inlet into a fluid circulation device and an outlet from each sensor system.

Sensor system components, such as fluid circulation devices, fluid circulation device controllers, electrical components such as capacitors and inductors, microcontrollers, heaters, flow sensors, and other components, are mounted on and electrically connected to the PCB substrate (152). For instance, the mounting and electrical connection can include TSVs, backside redistribution layers, and solder balls; or wire bonding. In some examples, the mounting can include curing an attachment element, such as an underfill layer or an adhesive. A filter is positioned at an inlet into each fluid circulation device (154).

Particulate matter sensors are mounted on and electrically connected to the PCB substrate (156). In some examples, the PCB substrate can act as the substrate of the particulate matter sensors. In some examples, the particulate matter sensors include integrated circuits, such as ASICs, and the integrated circuits are electrically connected to the PCB substrate, e.g., by TSVs, backside redistribution layers, and solder balls; or wire bonding.

A cover is formed, e.g., by molding, such as injection molding (158). The cover can be formed to define a portion of the fluid flow path through each of the multiple sensor systems. The cover can be formed to define the size separation features. The cover can be formed to define a large volume cavity between each fluid circulation device and the corresponding particulate matter sensor. The cover is attached to the PCB substrate (160), e.g., by an adhesive, to define multiple interior spaces within which the particulate matter sensors and other components of the sensor systems are disposed.

The PCB substrate, with attached components and cover, is singulated into individual particulate matter sensor systems (162), e.g., by dicing the PCB substrate.

Figure 11:
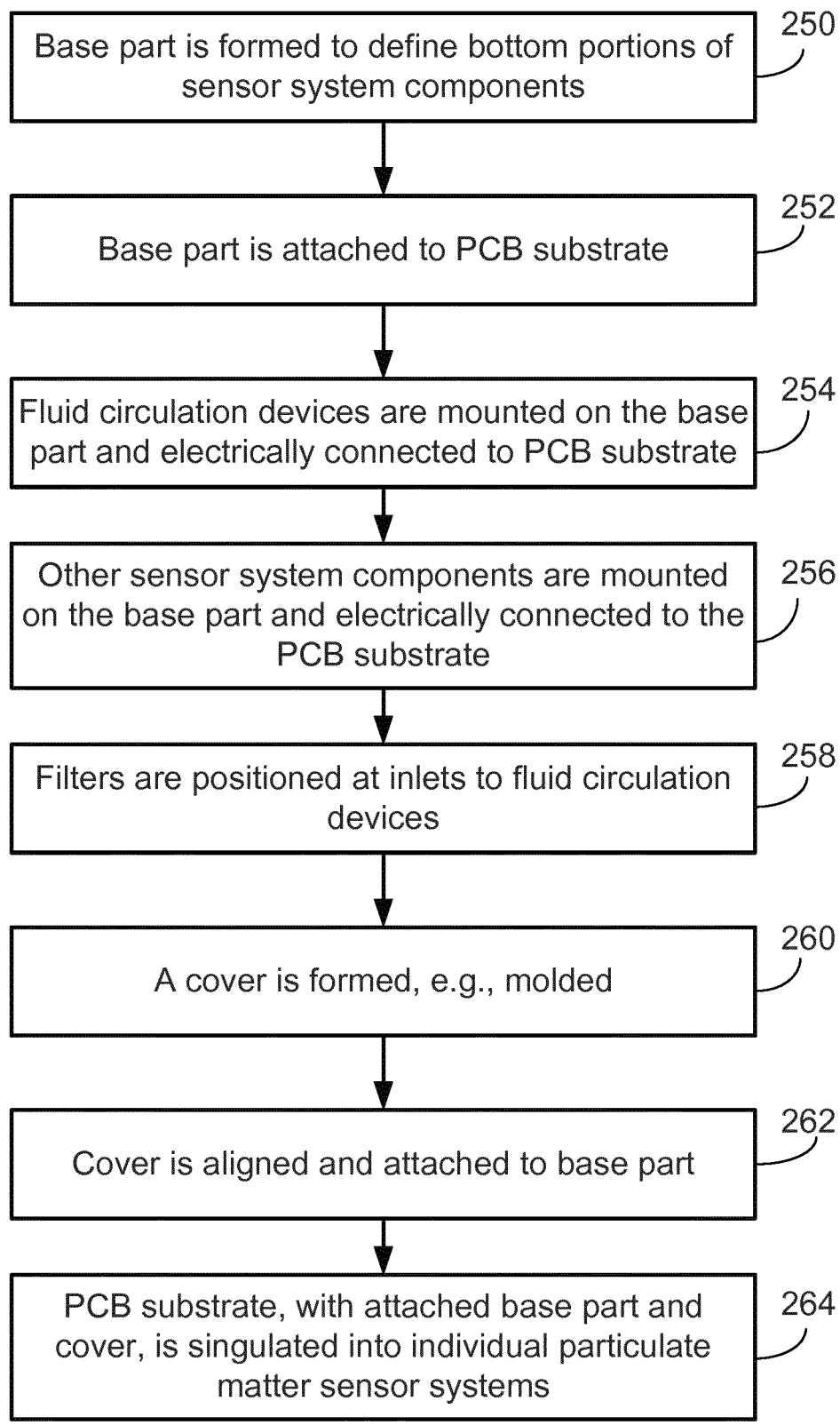

Referring to FIG. 11, in an example process for parallel manufacture of multiple particulate matter sensor systems, a base part is formed, e.g., by molding, such as injection molding (250). The base part is molded to define bottom portions of various components of the sensor systems, including mounts for fluid circulation devices and bottom portions of components of particulate matter sensors. The base part is attached to a PCB (252), e.g., with an adhesive, to form a substrate for the sensor system.

Fluid circulation device, such as pumps, are mounted on the base part and electrically connected to the PCB, e.g., by wire bonding (254). Other components of the sensor systems, such as fluid circulation device controllers, electrical components such as capacitors and inductors, microcontrollers, heaters, flow sensors, and other components, are mounted on the PCB and electrically connected to the PCB, e.g., by wire bonding (256). A filter is positioned at an inlet into each fluid circulation device (258). In some examples, the filter can be formed integrally with the base part rather than being positioned separately.

A cover is formed, e.g., by injection molding (260). The cover can be molded to define top portions of components of the sensor systems, including top portions of components of the particulate matter sensors. The cover is aligned with and attached to the base part (262).

The PCB substrate, with attached base part, components, and over, is singulated into individual particulate matter sensor system (264), e.g., by dicing the PCB substrate.

Figure 12:
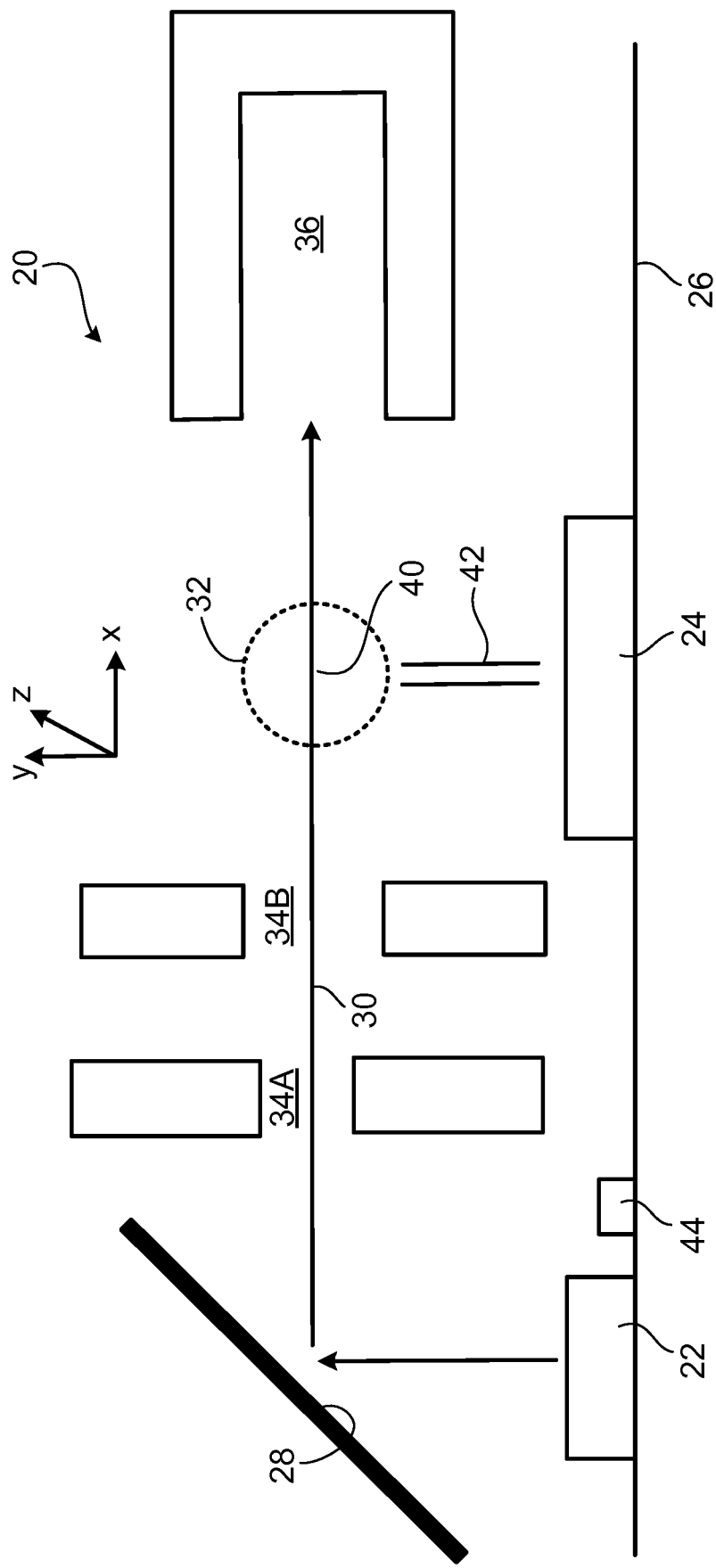
FIGS. 12-14 are diagrams of an optical-based particulate matter sensor.
Figure 13:
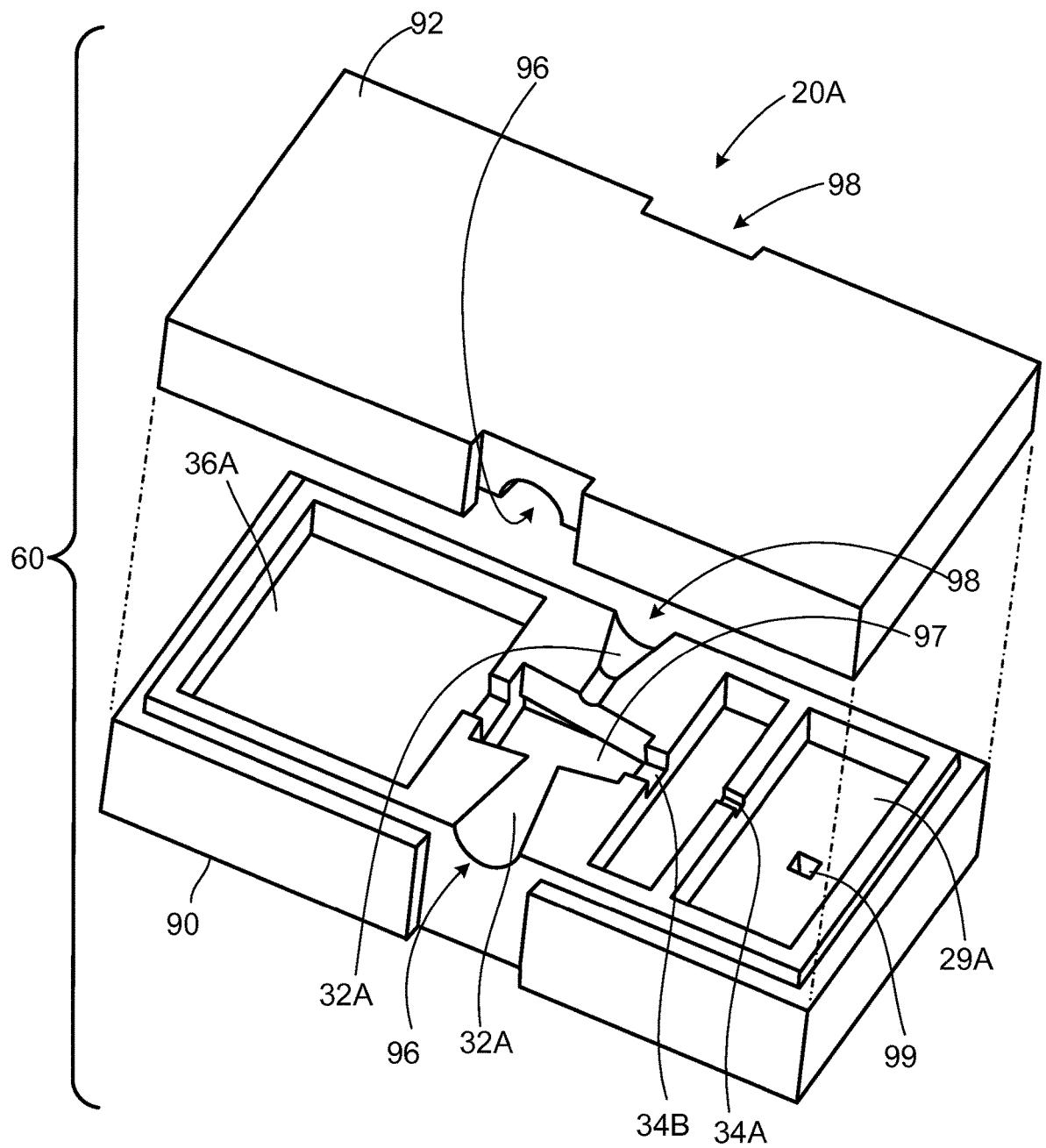

Referring to FIG. 12, an optical-based particulate matter sensor 20 includes a light source 22 (e.g., a vertical cavity surface emitting laser (VCSEL), a light emitting diode (LED), a laser diode, or another type of light source) operable to emit light toward a reflective surface 28. The reflective surface 28 redirects the emitted light along a path 30 through one or more light apertures 34a, 34b such that the light path 30 passes through a particle-light interaction chamber 40. Fluid flows through a fluid flow conduit 32, which can be substantially perpendicular to the light path 30. In the example of FIG. 13, the light path 30 is in the x-direction and the fluid flow conduit 32 is in the z-direction. As fluid flows through the conduit 32, the light beam interacts, in the particle-light interaction chamber 40, with particulate matter in the fluid. The interaction scatters some of the light toward a light detector 24 (e.g., a photodiode) operable to detect the scattered light. Light that does not interact with the particulate matter continues to travel into a light trap chamber 36 to prevent the light from being reflected back toward the detector 24.

In the example of FIG. 12, the light source 22 and the light detector 24 are positioned in the same plane. For instance, the light source 22 and detector 24 can be mounted on, and electrically connected to, a substrate 26 (e.g., the PCB substrate 102 of the sensor system 100 in FIG. 1). Light that is scattered in the particle-light interaction chamber 40 to an angle that is within the field of view of the light detector 24 is received by the light detector 24. For instance, light scattered at an angle of between about 45° and about 135° can reach the light detector 24.

In some examples, such as in the sensor 20 of FIG. 12, a light pipe or other waveguide 42 can be provided to guide the scattered light toward the light detector 24, e.g., contributing to a large field of view for the light detector 24 and reducing the effective distance from the particle-light interaction chamber 40 to the detector 24.

In some examples, the reflective surface 28 can be a mirror or a reflective coating on a prism-shaped structure, e.g., to enable miniaturization and parallel processing on packaging tools.

The detector 24 can be implemented, for example, as an optical photosensor that is operable to measure the signal of a single particle. In such instances, the pulse height is proportional to particle size, and the pulse count rate corresponds to the number of detected particles. The concentration can be derived, for example, from the number of detected particles, if the amount of the analyzed volume is known (e.g., air flow rate, measurement time). The mass can be calculated based on an assumed refractive index and density. In some examples, the detector 24 can be implemented as a photometer or nephelometer. The detector 24 can be integrated, for example, into a semiconductor chip that also may include electronics for reading, amplifying and processing the signals. In some cases, the processing circuitry can reside in a separate chip.

In some examples, a second light detector 44, such as a second photodiode, can be mounted on the substrate 26. The second light detector 44 can act as a reference light detector to monitor the light power emitted from the light source 22. The second detector 44 can be placed, for example, next to the light source 22 or below an aperture in the light trap chamber 36.

Figure 14:
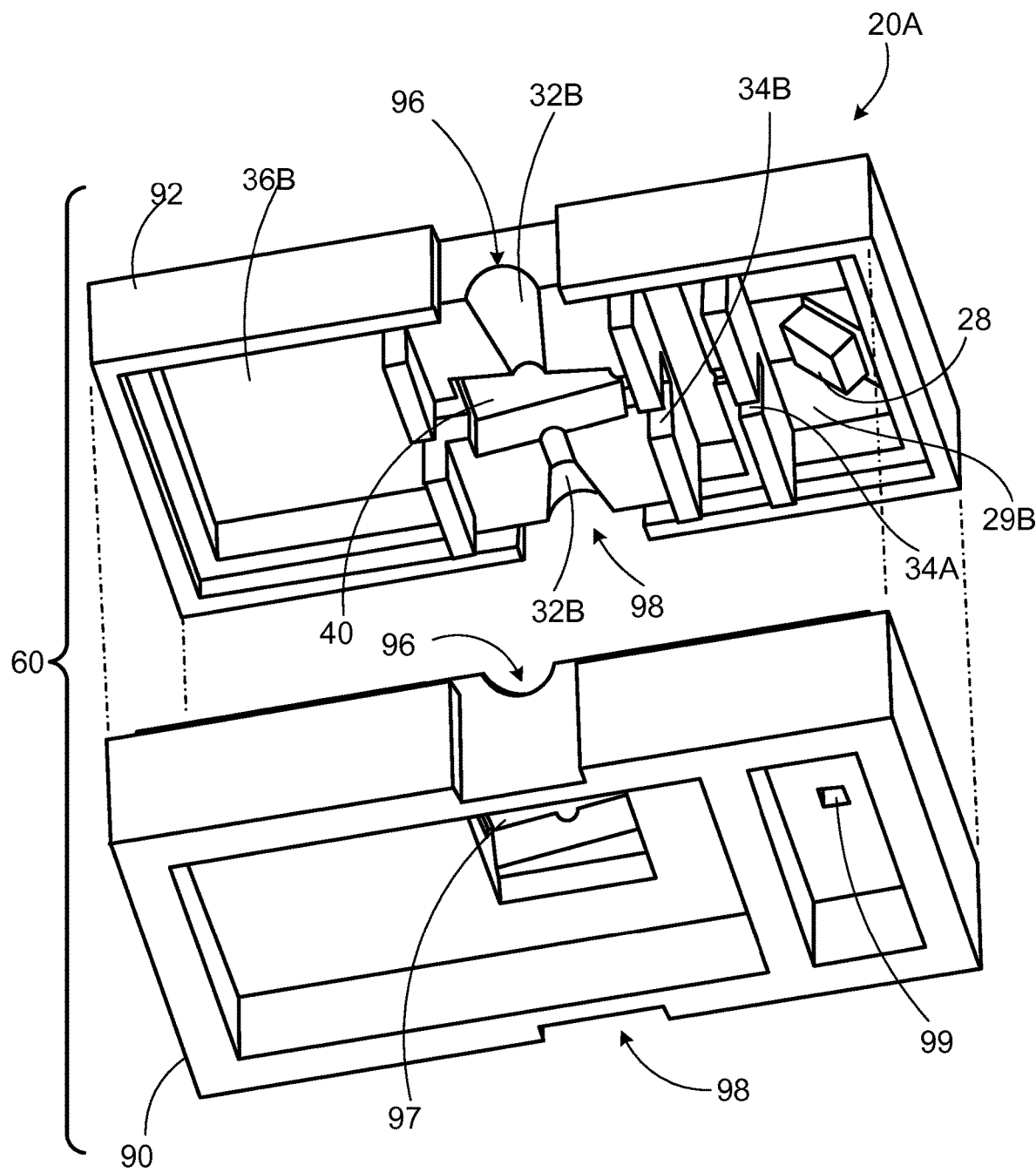

Referring to FIGS. 13 and 14, the particulate matter sensor 20 includes a housing 60, which can be attached over the substrate 26 on which the light source 22 and detector 24 are mounted. The housing 60 has a lower section 90 and an upper section 92, attached to one another, for example, by an adhesive. Each of the lower and upper sections 90, 92 can be composed, for example, of a plastic or resin, and can be formed, for example, by injection molding. Components of the particulate matter sensor 20a are formed integrally with the lower and upper sections 90, 92, e.g., by molding, providing a simple and low-cost manufacturing process. When attached together, the lower and upper sections, in combination, define the light beam path 30, including the apertures 34A, 34B, as well as the fluid flow conduit 32, the particle-light interaction chamber 40 and the light trap chamber 36.

A cavity 36A formed in the lower section 90 defines a first (lower) part of the light trap chamber 36, and a cavity 36B formed in the upper section 92 defines a corresponding, second (upper) part of the light trap chamber 36. Semi-conical indentations 32A formed in the lower section 90 define a first (lower) part of the fluid flow conduit 32, and semi-conical indentation 32B formed in the upper section 92 define a second (upper) part of the fluid flow conduit 32. The fluid flow conduit 32 includes a fluid inlet portion 96 to guide the fluid into the particle-light interaction chamber 40, and a fluid outlet portion 98 to guide the fluid away from the particle-light interaction chamber 40.

A first aperture 99 formed in the lower section 90 is aligned with the optical axis the light source (not shown in FIGS. 13 and 14) and also aligned with the reflective surface 28. The reflective surface 28 is disposed in a light reflection chamber defined by a cavity 29B in the upper section 102 and a corresponding cavity 29A in the lower section 90 of the housing. Thus, in combination, the lower and upper sections 90, 92 of the housing 60 also define the light reflection chamber. Light emitted by the light source passes through the aperture 99 toward the reflective surface 28, which in the implementation of FIGS. 13 and 14, is in the upper section 92. The reflective surface 28 is oriented so as to redirect the light beam through the apertures 34A, 34B and into the particle-light interaction chamber 40 where the light beam intersects the flow of fluid through the conduit 32 and can interact with particulate matter in the fluid. A second aperture 97 formed in the lower section 90 is aligned with the optical axis of the light detector 24 (not shown in FIGS. 13 and 14). Light scattered by the particulate matter to within the field of view of the detector 24 can pass through the aperture 97 to be sensed by the detector 24.

By forming the lower and upper sections 90, 92 of the housing 60, for example, by injection molding, the fluid flow conduit 32 and the particle-light interaction chamber 40 can form a single integral unitary piece such that the distance between them does not depend on mechanical alignment tolerances. Further, in some instances, the overall height of the module can be on the order of just a few millimeters (e.g., 2 mm). Other dimensions may be appropriate for some implementations. Such compact particulate matter sensor modules can help focus the fluid to be measured into a small region where the interaction with the light takes place so all or at least most of the pumped fluid (e.g., aerosol) can be analyzed within a reasonable measurement time.

Figure 15:
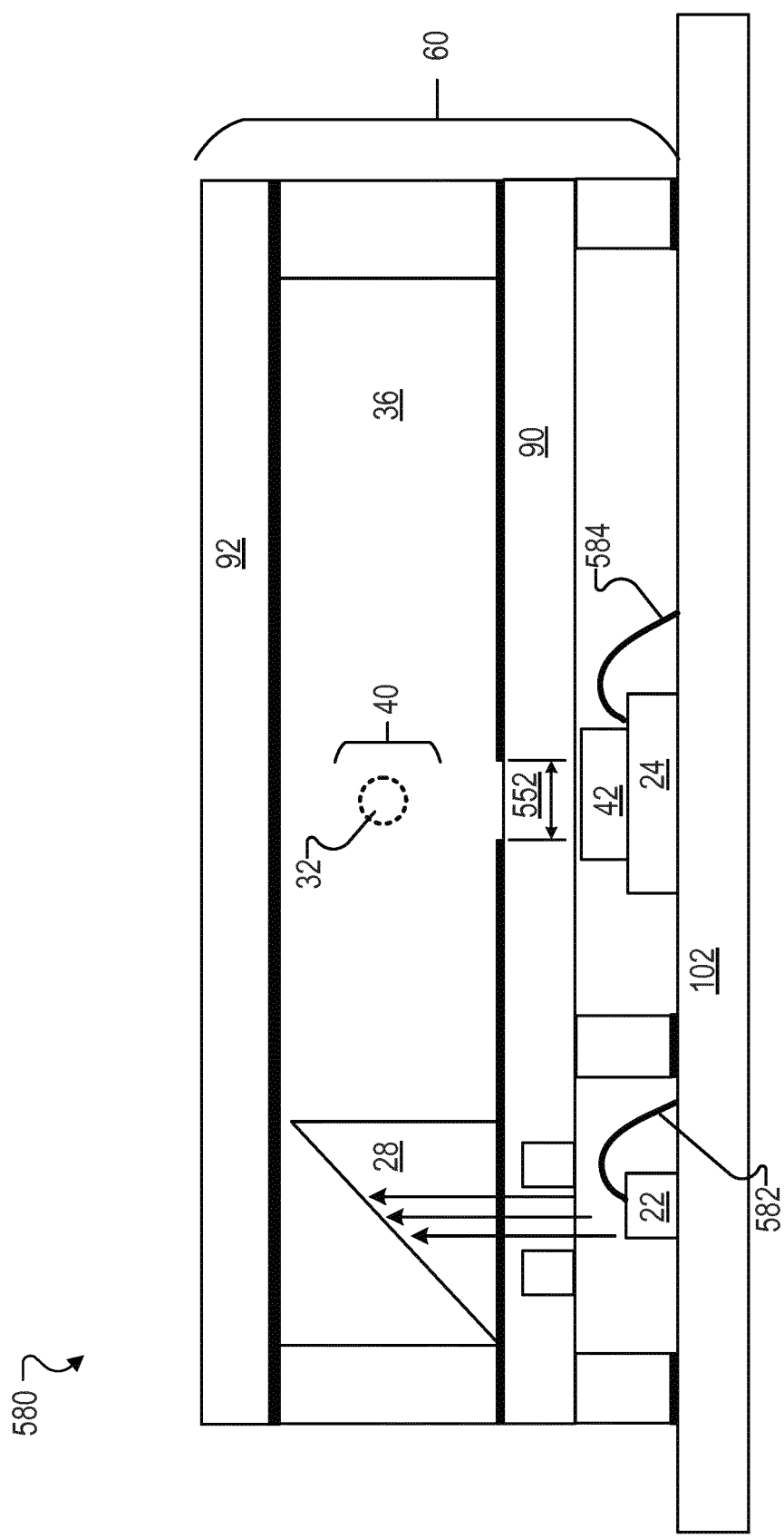
FIG. 15 is a diagram of an optical-based particulate matter sensor.

Referring to FIG. 15, in an example of an optical-based particulate matter sensor 580, the light source 22, such as a VCSEL, is mounted on and electrically connected to a PCB substrate, such as the PCB substrate 102 of the particulate matter sensor system (see FIG. 1). The light detector 24, such as a photodiode implemented in an ASIC chip, is also mounted on and electrically connected the PCB substrate 102. In the example of FIG. 15, the light source 22 and the light detector 24 are electrically connected to the PCB substrate 102 by wire bonding 582, 584. In some examples, the connection can be by through-silicon vias, backside redistribution layers, and solder balls.

The lower and upper sections 90, 92 of the housing 60 define an interior space for the particulate matter sensor 580. The reflective surface 28, implemented here as a prism, redirects light emitted by the light source 22 toward the particle-light interaction chamber 40. In the chamber 40, fluid flows through the fluid flow conduit 32, which is substantially perpendicular to the path of the light reflected by the reflective surface 28. Light scattered at a substantially 90° angle in the particle-light interaction chamber 40 passes through an aperture 552, through the waveguide 42 (here implemented as a light pipe), and is received by the light detector 24. Light that does not interact with the particulate matter in the particle-light interaction chamber 40 is absorbed in the light trap chamber 36.

In some examples, the interior walls of the sensor 580 can be coated with a non-reflective coating, such as a black coating, e.g., Acktar black. In some examples, alignment marks for the assembly of the lower and upper sections 90, 92 of the housing can also be made using Acktar black.

Figure 16A:
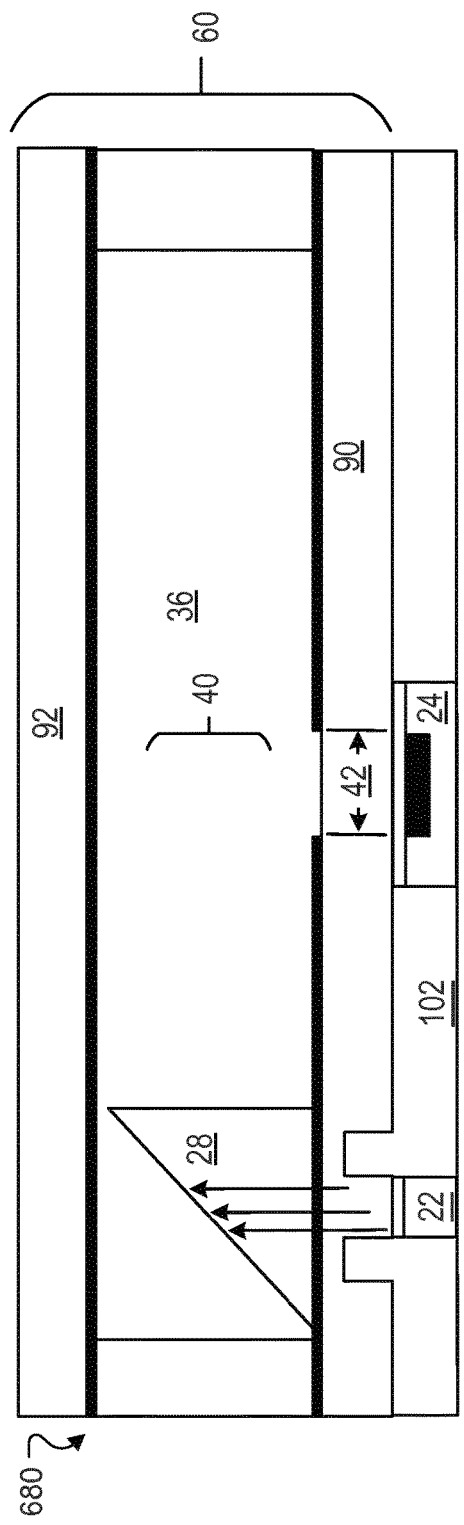
FIGS. 16A and 16B are diagrams of an optical-based particulate matter sensor.
Figure 16B:
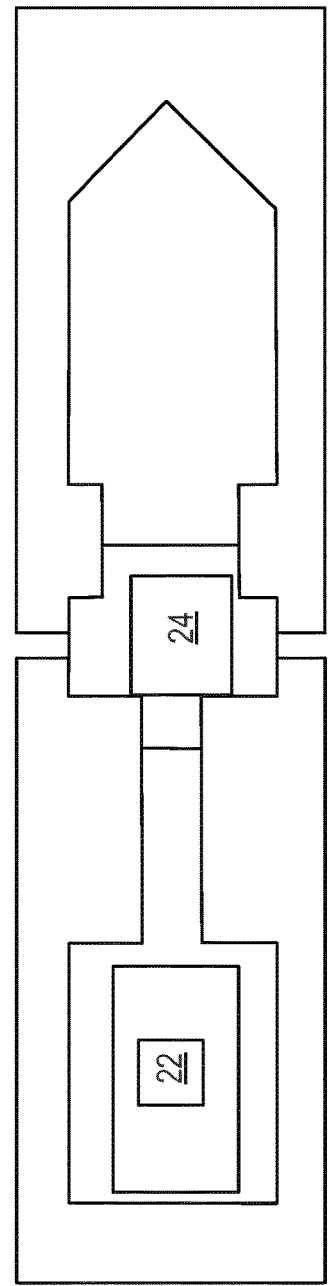

Referring to FIGS. 16A and 16B, in an example optical-based particulate matter sensor 680, the light source 22 and light detector 24 are mounted in on the substrate 102 (e.g., the particular matter sensor 680 can be disposed as shown for the sensor 10 of FIG. 7). In this configuration, the light source 22 and light detector 24 can be electrically connected to the PCB substrate by TSVs, backside redistribution layers, and solder balls. The lower section 90 of the housing 60 is disposed directly on the substrate 102. The waveguide 42 to guide light from the particle-light interaction chamber 40 to the light detector 24 is mounted on the photo detector. Due to the shorter distance of the light-particle interaction region towards the light pipe, the amount of scattered light reaching the photo detector is increased.

Figure 17A:
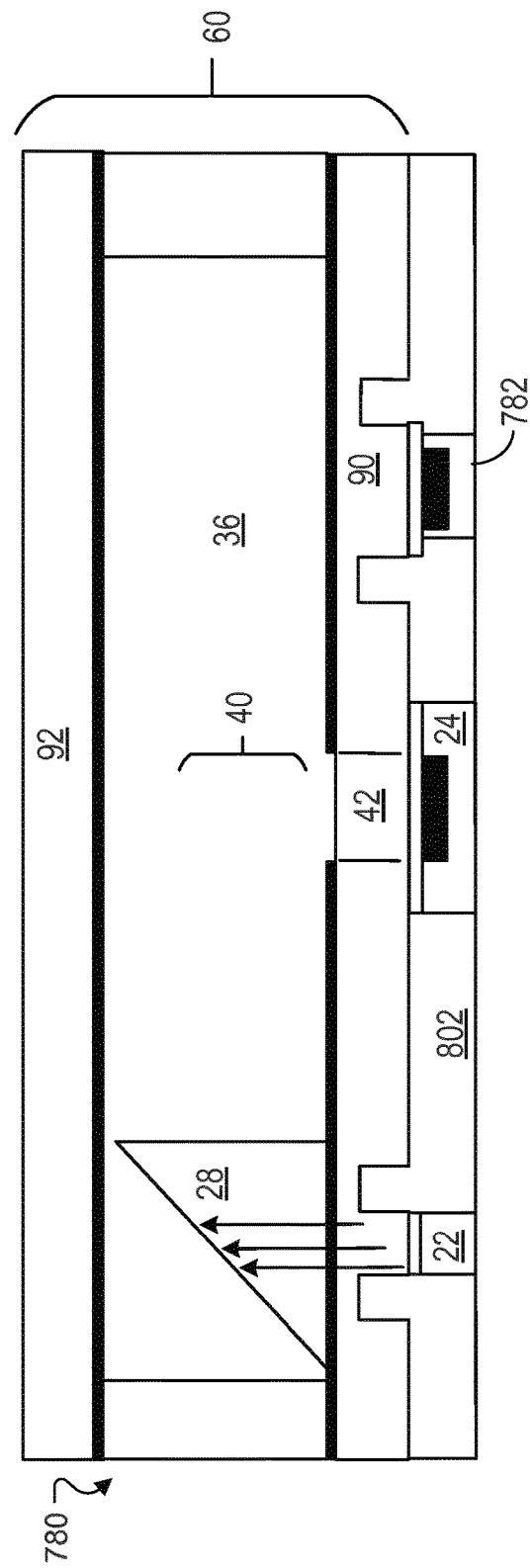
FIGS. 17A and 17B are diagrams of an optical-based particulate matter sensor.
Figure 17B:
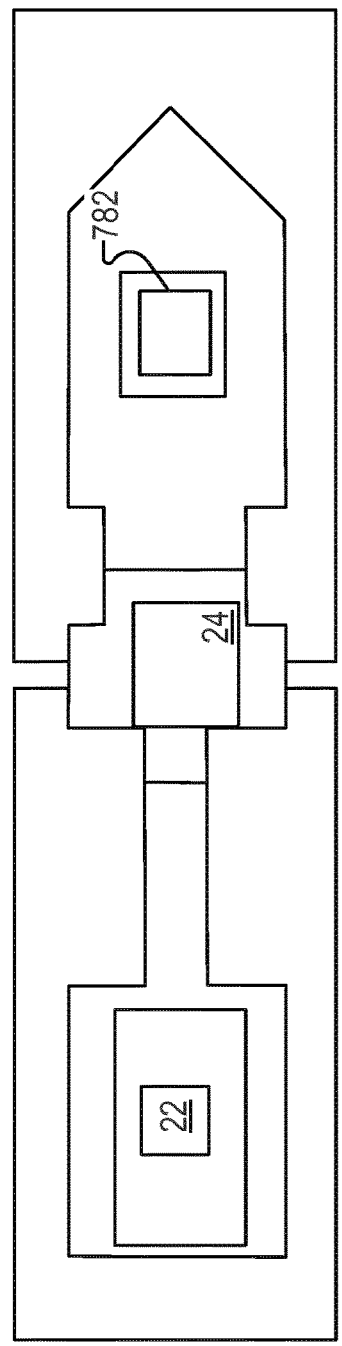

Referring to FIGS. 17A and 17B, an example optical-based particulate matter sensor 780 has a similar configuration to that shown in FIGS. 16A and 16B, and also includes a reference light detector 782 disposed in the light trap chamber 36, e.g., to provide a reference measurement for an amount of light emitted by the light source 22.

Figure 18:
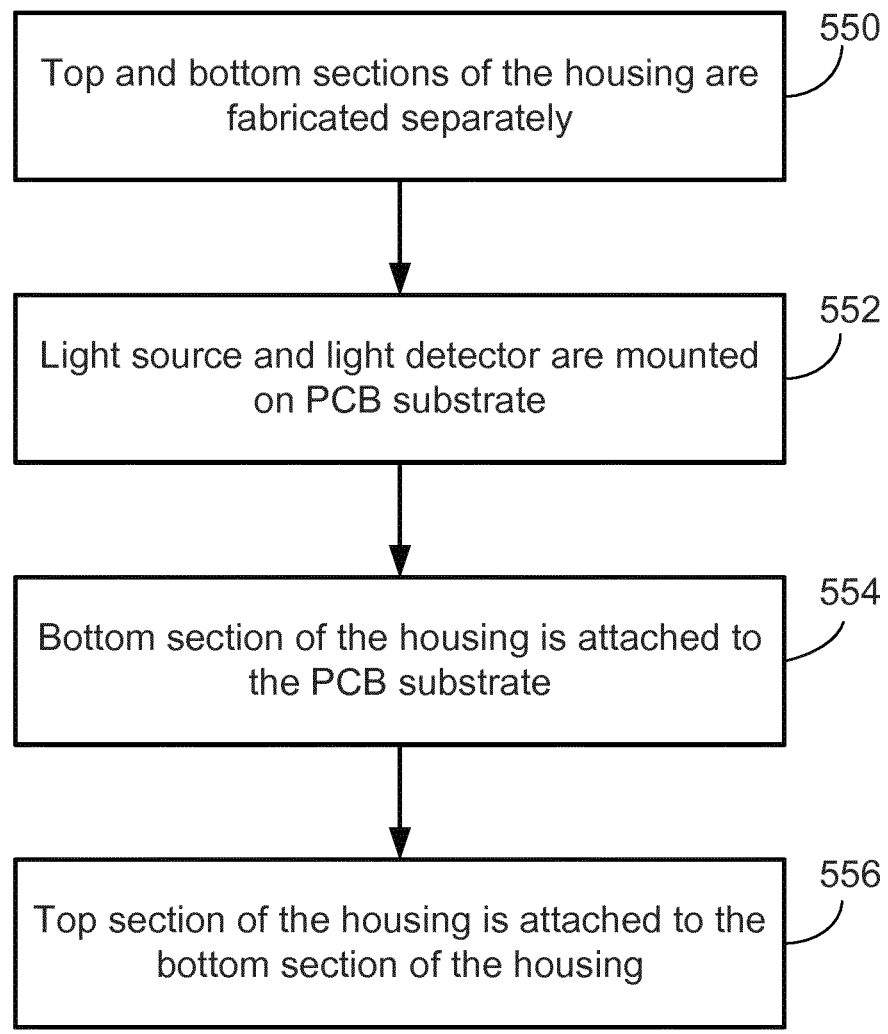
FIG. 18 is a flow chart.

Referring to FIG. 18, to manufacture an optical-based particulate matter sensor, each section 90, 92 of the housing 60 can be fabricated separately, for example, using an injection molding technique (550). The light source 22 and light detector 24 are mounted on a PCB (e.g., the PCB 102 of the sensor system 100 in FIG. 1) (552), and the lower section 90 of the housing 60 is attached (e.g., by adhesive) to the PCB (554). The second section 92 of the housing 60 is attached (e.g., by adhesive) to the first section 90 of the housing (556). In some examples, the sections 90, 92 can have alignment features that facilitate alignment of the second section 92 of the housing 60 to the first section 90 of the housing 60 during assembly.

In some examples, the lower section 90 of the housing 60 can be formed integrally with the base part, and the upper section 92 of the housing 60 can be formed integrally with the cover (e.g., as described with respect to FIGS. 8 and 11).

In some implementations, the foregoing manufacturing method can be performed as part of a wafer-level process. Wafer-level processes allow multiple modules to be fabricated at the same time. In the wafer-level process, multiple light source and light detectors are mounted on a substrate, such as a PCB. After attaching the wafers or molded materials that form the first and second sections of the housing, the stack can be singulated (e.g., by dicing) into separate individual particulate matter sensors. The particulate matter sensors can be assembled into particulate matter sensor systems, e.g., according to the assembly processes described above.

Figure 19:
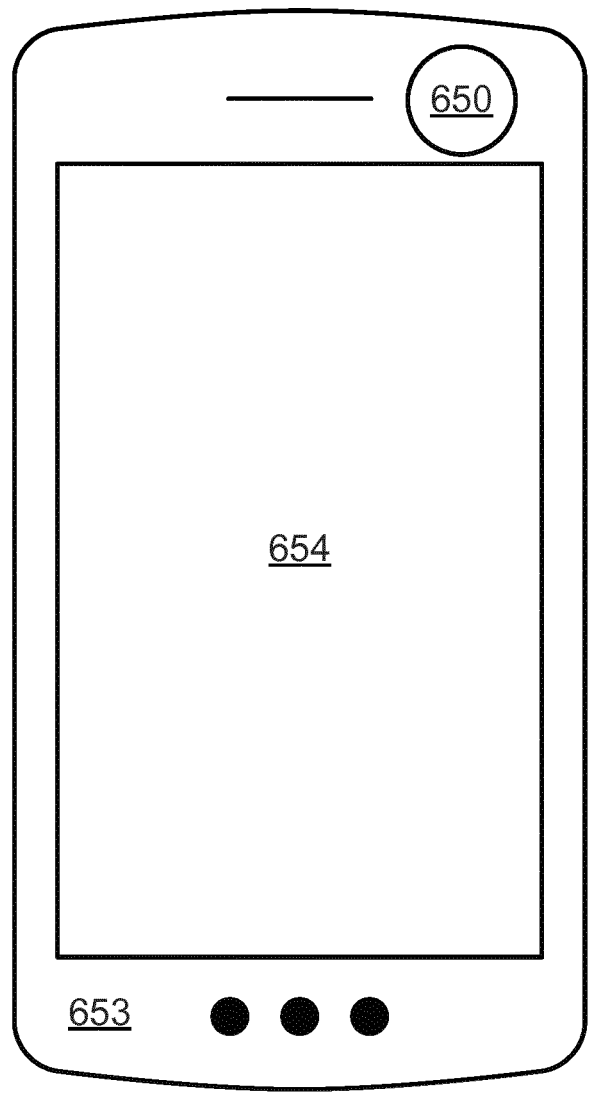
FIG. 19 is a diagram of a mobile computing device.

Referring to FIG. 19, a particulate matter sensor system 650 such as those described above can be incorporated into a mobile computing device 652, such as a mobile phone (as shown), a tablet, or a wearable computing device. The particulate matter sensor system 650 can be operable by a user, e.g., under control of an application executing on the mobile computing device 652, to conduct air quality testing. A test result can be displayed on a display screen 654 of the mobile computing device 652, e.g., to provide substantially immediate feedback to the user about the quality of the air in the user's environment.

The particulate matter sensor systems described here can also be incorporated into other devices, such as air purifiers or air conditioning units; or used for other applications such as automotive applications or industrial applications.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

The invention claimed is:

1. A particulate matter sensor system for sensing particulate matter in a fluid, the system comprising:
   a substrate;
   a cover disposed on the substrate, the cover defining at least a portion of a flow path through the microfluidic system;
   a particulate matter sensor disposed in an interior space between the cover and the substrate, the particulate matter sensor comprising an integrated sensor device electrically connected to the substrate, in which the flow path is defined through the particulate matter sensor; and
   a fluid circulation device disposed in the interior space between the cover and the substrate and configured to cause fluid to flow along the flow path through the microfluidic system;
   wherein the interior space between the cover and the substrate is sized so as to dampen a fluid flow fluctuation induced by the fluid circulation device.

2. The system of claim 1, in which the substrate comprises a printed circuit board.

3. The system of claim 1, in which a channel formed in the substrate defines a portion of the flow path through the microfluidic system.

4. The system of claim 1, in which the cover comprises a molded cover.

5. The system of claim 1, in which the cover is glued to the substrate.

6. The system of claim 1, in which the fluid circulation device comprises one or more of a pump, a fan, a heater, and an ultrasonic nozzle.

7. The system of claim 1, in which one or more of:
   a controller for the fluid circulation device,
   a flow sensor,
   a heater positioned to heat fluid in a portion of the flow path,
   a photodetector, and
   a light source
   are electrically connected to the substrate.

8. The system of claim 1, comprising a filter disposed at an inlet into the fluid circulation device.

9. The system of claim 1, comprising a size separation feature.

10. The system of claim 1, in which the substrate comprises a mount for the fluid circulation device, at least a portion of the flow path through the microfluidic system being defined in the mount.

11. The system of claim 1, in which the substrate comprises a base part defining a first portion of the particulate matter sensor, and in which the cover defines a second portion of the particulate matter sensor.

12. The system of claim 11, in which a channel formed in the base part defines a portion of the flow path through the particulate matter sensor.

13. The system of claim 11, in which the particulate matter sensor comprises an optical particulate matter sensor, and in which the base part and the cover each define at least a portion of one or more of a nozzle, an aperture, and a light trap of the optical particulate matter sensor.

14. The system of claim 11, in which the particulate matter sensor comprises a filter-based particulate matter sensor, and in which the base part and the cover each define at least a portion of a filter housing of the filter-based particulate matter sensor.

15. The system of claim 1, in which the particulate matter sensor comprises a filter-based particulate matter sensor, and/or an optical particulate matter sensor, and in which the integrated sensor device comprises a photodetector.

16. The system of claim 1, in which the optical particulate matter sensor comprises a fluid flow conduit configured to induce a change in fluid pressure in the flow path through the microfluidic system.

17. The system of claim 1, in which the particulate matter sensor comprises a particulate matter sensor based on thermophoretic deposition of particulate matter onto a receiving surface of the integrated sensor device.

18. A method of making a particulate matter sensor system, the method comprising:
   disposing a particulate matter sensor on a substrate, including electrically connecting an integrated circuit device of the particulate matter sensor to the substrate;
   disposing a fluid circulation device on the substrate; and
   positioning a cover on the substrate to define an interior space between the cover and the substrate, the particulate matter sensor and the fluid circulation device being contained within the interior space, the cover defining at least a portion of a flow path through the particulate matter sensor system,
   wherein the interior space between the cover and the substrate is sized so as to dampen a fluid flow fluctuation induced by the fluid circulation device.

19. The method of claim 18, comprising forming a channel in the substrate and/or the cover the channel defining a portion of the flow path through the particulate matter sensor system.

20. The method of claim 18, comprising:
molding a base part to define a bottom portion of the particulate matter sensor; and
disposing the base part on a PCB to form the substrate.

21. The method of claim 18, comprising determining a size for the cavity to dampen a fluid flow fluctuation induced by the fluid circulation device.

22. The method of claim 18, comprising:
making multiple particulate matter sensor systems, comprising:
disposing multiple particulate matter sensors on the substrate, including electrically connecting an integrated circuit device of each particulate matter sensor to the substrate,
disposing multiple fluid circulation devices on the substrate, and
positioning the cover on the substrate to define multiple, distinct interior spaces, one particulate matter sensor and one fluid circulation device being contained within each interior space; and
dicing the substrate to separate the multiple particulate matter sensor systems.

23. A method of sensing particulate matter in a fluid using a particulate matter sensor system, the method comprising:
flowing the fluid through a flow path through the particulate matter sensor system by operating a fluid circulation device disposed on a substrate, at least a portion of the flow path being defined by a cover of the particulate matter sensor system, including:
flowing the fluid through a particulate matter sensor disposed in an interior space between the cover and the substrate, the particulate matter sensor comprising an integrated sensor device electrically connected to the substrate,
wherein the interior space between the cover and the substrate is sized so as to dampen a fluid flow fluctuation induced by the fluid circulation device; and
detecting an amount of particulate matter in the fluid by the particulate matter sensor.

24. The method of claim 23, comprising removing particles larger than a threshold size from the fluid by a size separation feature upstream of the particulate matter sensor.

* * * * *